United States Patent [19]

Penor, Jr.

[11] Patent Number: 5,161,815
[45] Date of Patent: Nov. 10, 1992

[54] SELF ALIGNING TRAILER HITCH

[76] Inventor: Earl L. Penor, Jr., 1006 Perkins, Richland, Wash. 99352

[21] Appl. No.: 533,883

[22] Filed: Jun. 6, 1990

Related U.S. Application Data

[63] Continuation-in-part of Ser. No. 7,106,104, Oct. 7, 1987, abandoned.

[51] Int. Cl.$^5$ ............................................. B60D 1/06
[52] U.S. Cl. .................................. 280/477; 280/405.1; 280/511; 280/512; 403/316
[58] Field of Search ............... 280/477, 511, 512, 513, 280/405.1, 406.2, 478.1, 479.2, 479.3, 479.1; 403/316, 317

[56] References Cited

U.S. PATENT DOCUMENTS

| | | | |
|---|---|---|---|
| 3,521,908 | 7/1970 | Carter | 280/479.1 |
| 3,588,145 | 6/1971 | Thompson | 280/477 |
| 3,679,243 | 7/1972 | Hamerl | 280/511 |
| 3,801,133 | 4/1974 | Thompson | 280/406.2 |
| 3,879,062 | 4/1975 | Miller | 280/477 |
| 4,778,196 | 10/1988 | Spoliansky | 280/512 |
| 4,792,151 | 12/1988 | Feld | 280/477 |

FOREIGN PATENT DOCUMENTS 2175262 11/1986 United Kingdom ................ 280/511

Primary Examiner—Eric D. Culbreth
Attorney, Agent, or Firm—Roy E. Mattern, Jr.

[57] ABSTRACT

A self aligning trailer hitch, used by a driver alone without creating any personal lifting force, to couple and decouple a towing vehicle and a trailer, has a multiple piece assembly of a socket for securement to a towing vehicle, having a rotatable claw, which has a spherical recessed surface adapted to receive a portion of a lower ball of a vertical dual ball assembly, which is secured to a towed vehicle. Upon hitching the vehicles together, the rotatable claw contacts the lower ball, when this socket is moving horizontally, during movement of a towing vehicle toward the towed vehicle, causing the lower ball to be repositioned upwardly and over center, while being guided in a vertical plane, and then held in the radially upwardly repositioned spherical recessed surface of the rotatable claw. A three dimensional ramp guides the lower ball to fully contact the spherical recessed surface of the rotatable claw. This ramp has an entry ramp portion, respective left and right side portions, which commence widely spaced to create a wide mouth entrance, and thereafter converge to a narrow throat exit, and also respective left and right integral curved transition portions, located between the entry ramp portion and the respective side portions, having a radii of these curved transition portions. Another spherical recessed surface, located on the multiple piece socket assembly, receives a portion of a lower ball stopping it, and contributing to the holding thereof. A lock keeps the rotatable claw in this lower ball holding position. This self aligning trailer hitch may include a load equalizer assembly.

33 Claims, 13 Drawing Sheets

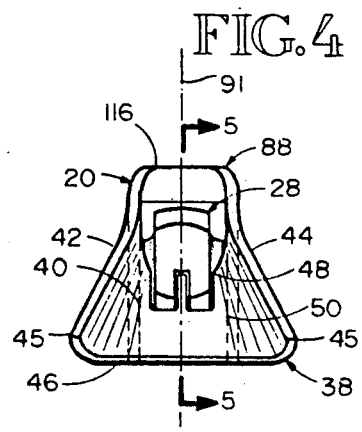
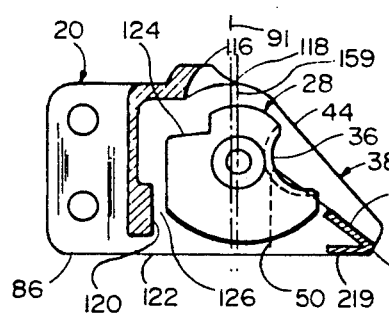
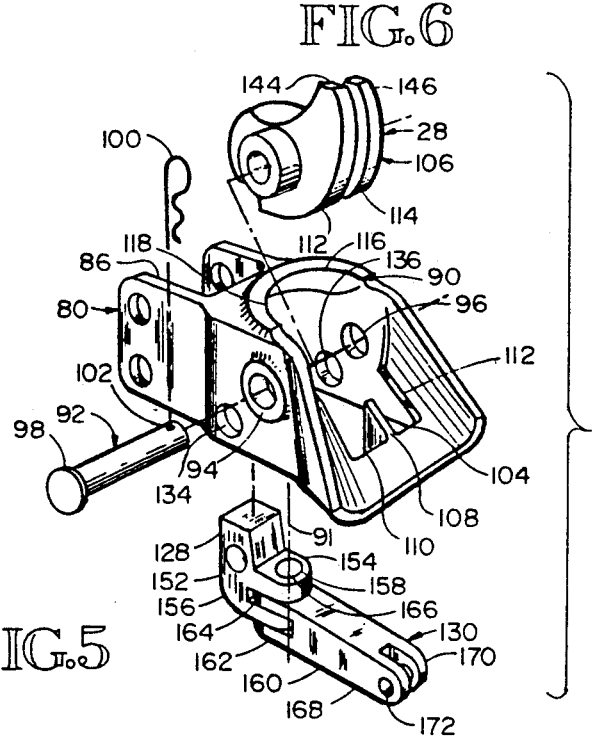
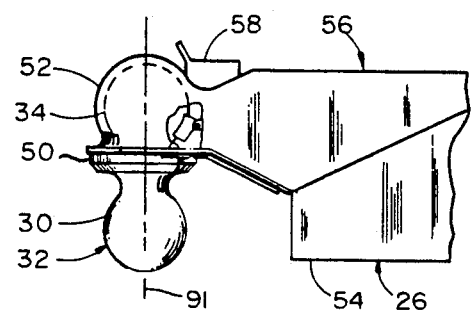
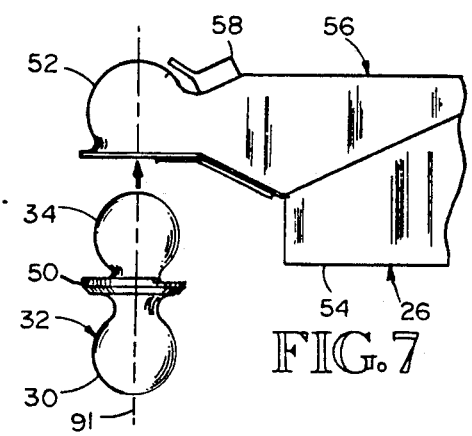
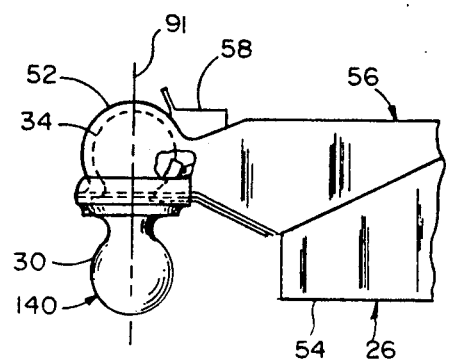
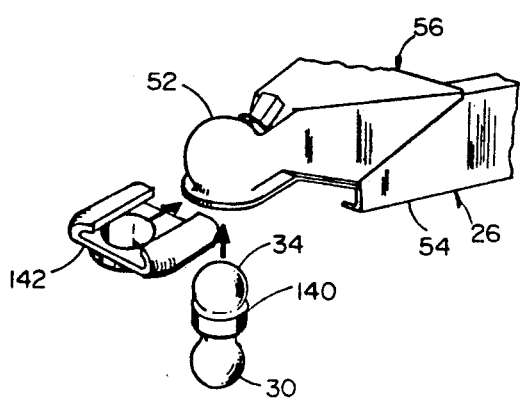

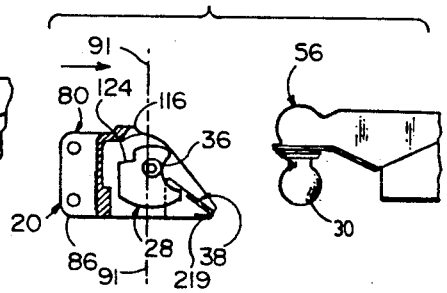
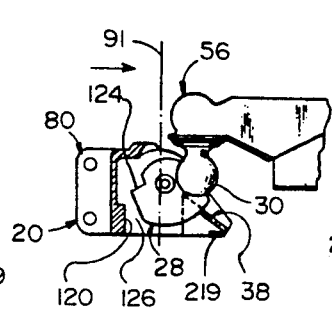
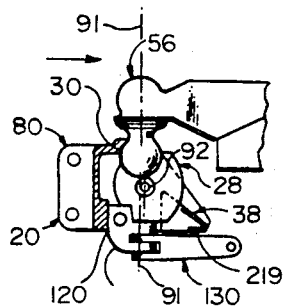
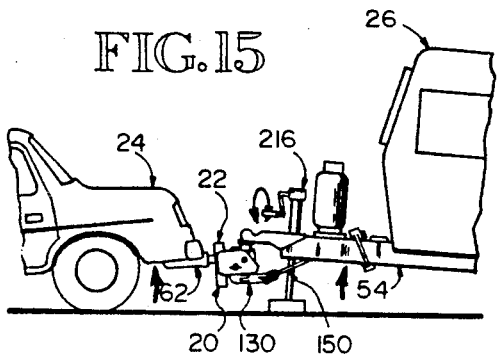
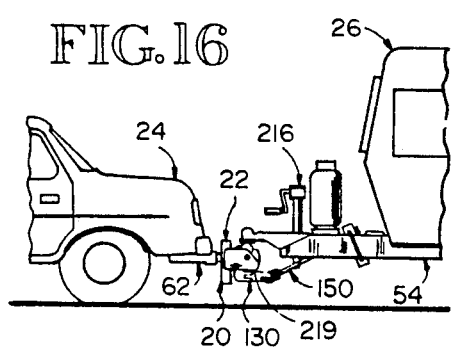
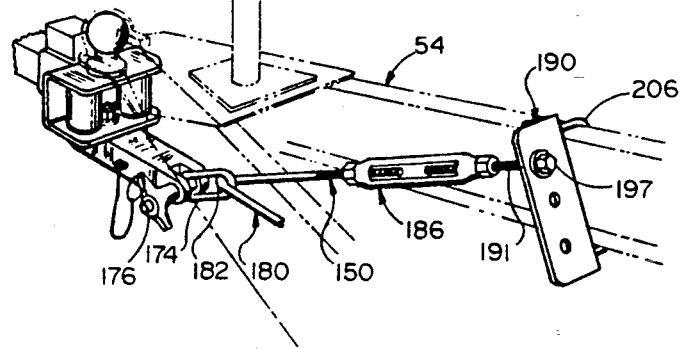
FIG. 17 PRIOR ART

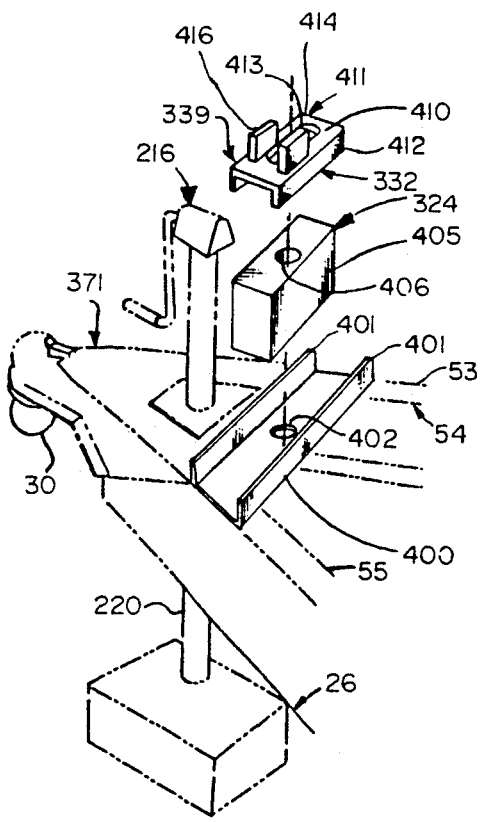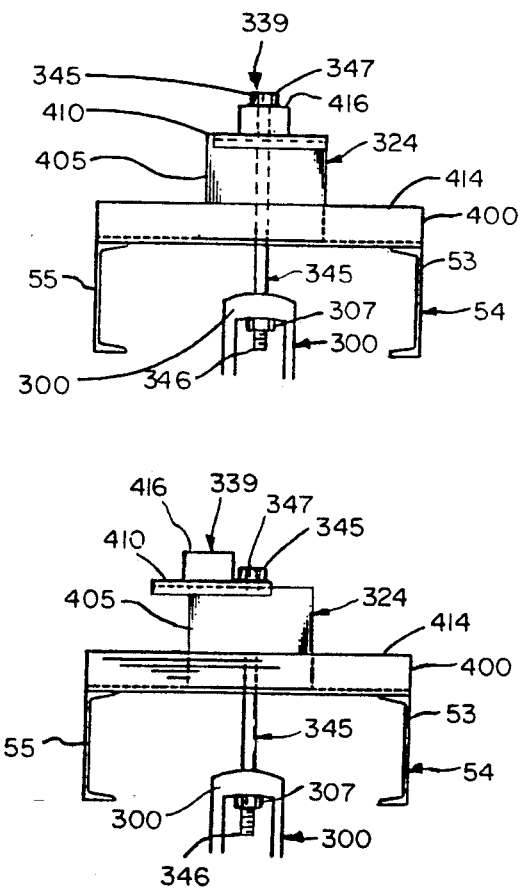

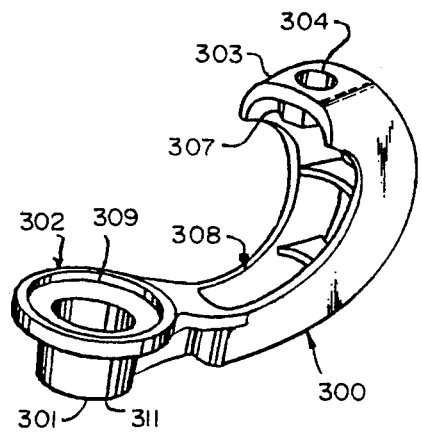
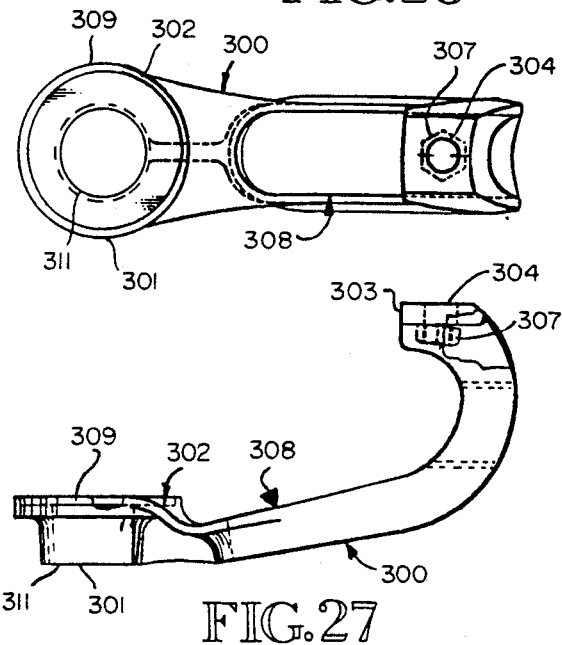
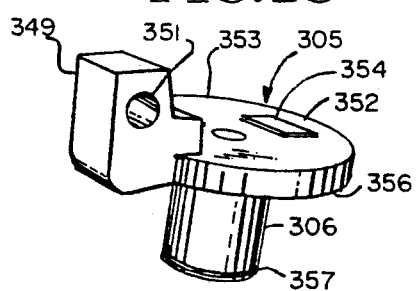
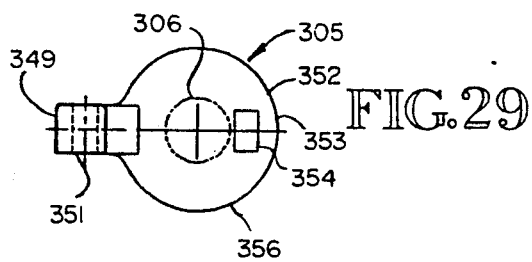
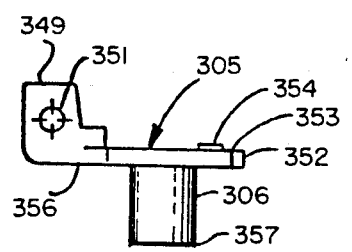

SELF ALIGNING TRAILER HITCH

CROSS REFERENCE

This is a continuation in part application of copending application Ser. No. 07/106,104 filed Oct. 7, 1987 by the same applicant Earl L. Penor Jr., and having the same title, A Self Aligning Trailer Hitch, now abandoned.

BACKGROUND

Most of the trailer hitches used today still have an upstanding ball on the towing bar of the towing vehicle and the inverted socket mounted on the tongue of the trailer. The alignment of the inverted socket over the upstanding ball and the subsequent vertical motion engagement of the inverted socket down over the upstanding ball is still today often a time consuming process and often a risk assuming process. This is especially so when the driver of the towing vehicle must couple or hitch the towing vehicle to the trailer without the assistance of another person. Moreover, when the trailer tongue weight is high, and/or the trailer is heavy, a person has difficulty making any adjustments in prepositioning the inverted socket over the upstanding ball.

There have been and are trailer hitches and accessories therefore, which are directed to making it more convenient and/or safer to couple or to hitch a towing vehicle to a trailer. Cyril L. Carter in 1970 in his U.S. Pat. No. 3,521,908 illustrated and described his self aligning trailer hitch, which during the coupling has an extending and pivotal hitch bar portion to undertake the alignment in a convenient way. Then following the initial coupling, the pivotal hitch bar portion, upon relative motion of the vehicles, is telescoped within the encompassing tow bar, and then locked into place during the towing time of the coupled or hitched towing vehicle and the trailer.

Daniel C. Miller in his U.S. Pat. No. 3,879,062 in 1975, disclosed his trailer hitch guide, used in directly guiding the leading end of a trailer tongue, so the inverted socket thereon, would be in vertical alignment over the mating hitch ball on the tow bar of a towing vehicle. His trailer hitch guide had a V shaped element supported by other portions thereof, in turn supported on portions of the towing vehicle.

Woodrow F. Thompson in his two patents, U.S. Pat. No. 3,588,145 of 1971 pertaining to a trailer hitch, and U.S. Pat. No. 3,801,133 of 1974 pertaining to a load leveling and anti-sway trailer hitch, illustrated and described the use of his shovel or guide plate. Whether or not the ball was on the towing vehicle or the trailer, or the socket was on the vehicle or the trailer, his guide plate was positioned to direct the relative motion approach of the ball and socket, so they would be in vertical alignment. Then subsequent vertical lowering of the trailer tongue would bring the ball into engagement within the socket.

Also Mr. Thompson in his U.S. Pat. No. 3,801,133 illustrated and described how his load leveling bars were arranged for pivotal movement about an axis, which was coincident with the vertical axis of the ball and socket coupling.

Arthur John Hameri in his U.S. Pat. No. 3,679,243 of 1972 discloses his coupling assembly wherein a depending ball secured to a trailer tongue rides up a ramp and drops down in a holding cavity. A cover plate is secured thereafter to keep the ball in the holding cavity.

Also Arthur John Hameri in his British patent 2,175,262 A of 1986 illustrated and described a ball and socket coupling wherein a depending ball rides up a ramp and drops down into a two piece cavity, one piece of which is moved to lock and unlock the depending ball in the cavity.

These persons and other people have provided trailer hitches which have helped the owners and operators of towing vehicles to couple the ball and socket of respective trailers with greater convenience, safety and speed. Yet there remained a need for providing a trailer hitch which could be readily adapted for coupling securement to a towing vehicle, in a well understood way, to provide a combined self alignment structure with a better receiving socket structure, to guide, receive, align, and encompass a ball, conveniently and quickly secured to a conventional socket equipped trailer tongue of a trailer. Moreover, the decoupling would also be conveniently and safely undertaken.

SUMMARY

This self aligning trailer hitch with or without its load equalizing subassembly is used safely, quickly, and conveniently by persons in a wide age range, who, as necessary, may be required to couple their towing vehicle to a trailer, without the assistance of another person. No longer must the socket and the ball be first vertically aligned for subsequent vertical relative movement to complete the coupling, as the ball is vertically moved axially into the socket. No longer must load equalizing bars at their respective ends be forcefully raised to create the bending moments used in leveling the towing vehicle and the trailer.

Now a vertical arrangement of dual balls is secured to a trailer tongue, as the top ball is secured to the inverted socket on the tongue, to thereafter present a depending bottom ball on the trailer tongue. Then secured to a tow bar, in turn secured to the frame of a towing vehicle, is a self aligning multiple piece assembly of a socket positioned on a hitch head body. When relative motion occurs between the depending bottom ball and this socket assembly, which occurs as the towing vehicle is backed up to the trailer, the depending bottom ball after being contacted by a three dimensional non bindable guiding ramp or chute of the socket assembly is guided centrally and upwardly to be ultimately positioned, in part, against a ball receiving complementary hold down seat of the socket assembly. During this centrally and upwardly travel the depending bottom ball bears against an initially downwardly rotated ball receiving claw of the socket assembly, and soon causes the upward rotation of the ball receiving claw. When the ball reaches the hold down seat, the receiving claw has moved into a socket creating position to hold the ball in place completing the load carrying coupling or hitching of the towing vehicle and the trailer. This socket creating position is insuredly maintained by the upward installation of a locking abutment, which interfits with the receiving claw to keep it from rotating. Moreover a locking pin is used to keep the locking abutment in place, to complete the closure of the multiple piece socket assembly about the depending bottom ball, where it so remains during the pulling of the trailer.

At this time the towing vehicle and the trailer are joined for towing, unless load equalizing is needed. If so, then in reference to one embodiment of a load equalizer assembly, the locking abutment used also has a depending pivoting link subassembly. It is used to secure the forward closed end of a wishbone, using a chain link, equalizing bar subassembly, which is adjustably secured to the tongue of a trailer. By using the trailer tongue jack, the coupling is raised and then the wishbone equalizing bar subassembly is easily secured. Thereafter upon lowering the coupling by using the jack, the wishbone is tensioned and the load equalization is completed.

Also if a load equalizer assembly is needed in another embodiment, the locking abutment is an upstanding lug portion of a lock lug, which is formed with a depending shaft which receives an equalizing arm. This arm in turn is secured to the tongue of a towed vehicle by a compression spring assembly.

DRAWINGS OF THE PREFERRED EMBODIMENTS

The self aligning trailer hitch used with and without a load equalizing assembly is illustrated in the drawings, wherein:

FIG. 4 is an elevation view looking into the hitch head body of the self aligning trailer hitch showing the lower ball guiding ramp, the rotatable claw, the spherical recesses to receive, to stop, and to hold the lower ball;

FIG. 5 is a section view, taken on line 5—5 of FIG. 4, showing the same components shown in FIG. 4 positioned ready to receive the lower ball;

FIG. 6 is an exploded view of the hitch head body, the rotatable claw, the shaft for the claw, the pivoting link assembly, and the alternatively used locking lug;

FIG. 7 is a side view illustrating the installing motion of the pair of balls, upper and lower, vertical positioned, during the insertion into the inverted socket secured to a tongue of a trailer;

FIG. 8 is a partial side view showing the completed installation of the pair of balls, with the upper ball being held in place by the latch, and the lower ball depending for guidance by the guiding ramp of the hitch head body;

FIG. 9 is a partial perspective view indicating another embodiment of a pair of balls and the clip like retainer used in supplementing the vertical securement of the upper ball, with motion arrows indicating the assembly thereof;

FIG. 10 is a partial side view illustrating the completed assembly of the pair of balls and clip like retainer, and the closing of the latch, to keep these upper and lower balls in place;

FIGS. 11, 12, and 13 are partial side views illustrating in FIG. 11, the approaching of the hitch head body of the towing vehicle toward the lower ball of the trailer, with the rotatable claw rotated downwardly to receive the lower ball; showing in FIG. 12 how the lower ball has been guided into contact with the rotatable claw, which is then starting to rotate upwardly; and illustrating in FIG. 13, how the lower ball has reached the securement position, resting against the spherical recessed surface of the hitch head body, being captured in the spherical recessed socket of the rotatable claw, and being so retained as the locking insert portion of the pivoting link assembly is positioned in the right angled locking notch of the rotatable claw, while also being positioned adjacent the vertical planar locking surface of the hitch head body;

FIG. 14 is a partial top view to illustrate how the lower ball is guided by the guiding ramp after arrival off center to be soon centered for entry into the self aligning trailer hitch to be captured by the rotatable claw;

FIGS. 15 and 16 illustrate how load equalization is undertaken, with the trailer jack being used to raise the tongue of the trailer in FIG. 15, while the load equalizing assembly is finally connected, via the chain link, and then after unjacking the towing vehicle and the trailer are substantially level;

FIG. 17 is a partial perspective view to illustrate how the chain link of the load equalizing assembly is secured to the pivoting link assembly, during the load equalization shown in FIGS. 15 and 16, and also the other hitch components are of a prior art trailer hitch, to indicate this load equalizing assembly is also useful in conjunction with other trailer hitches.

Figure 18:
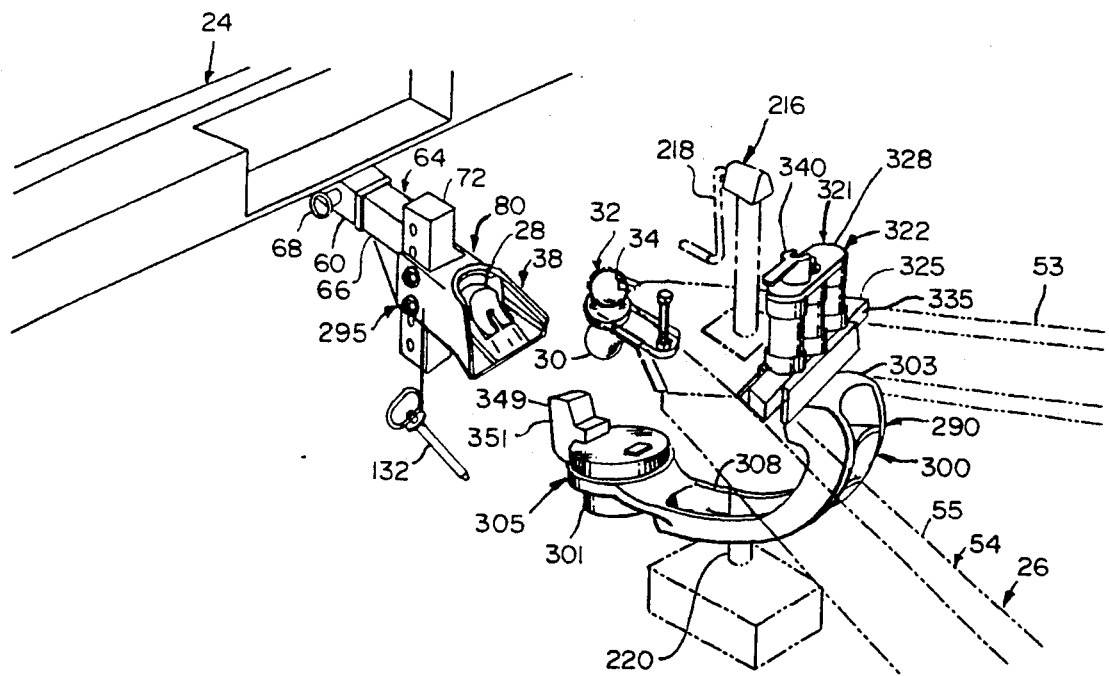
Figure 19:
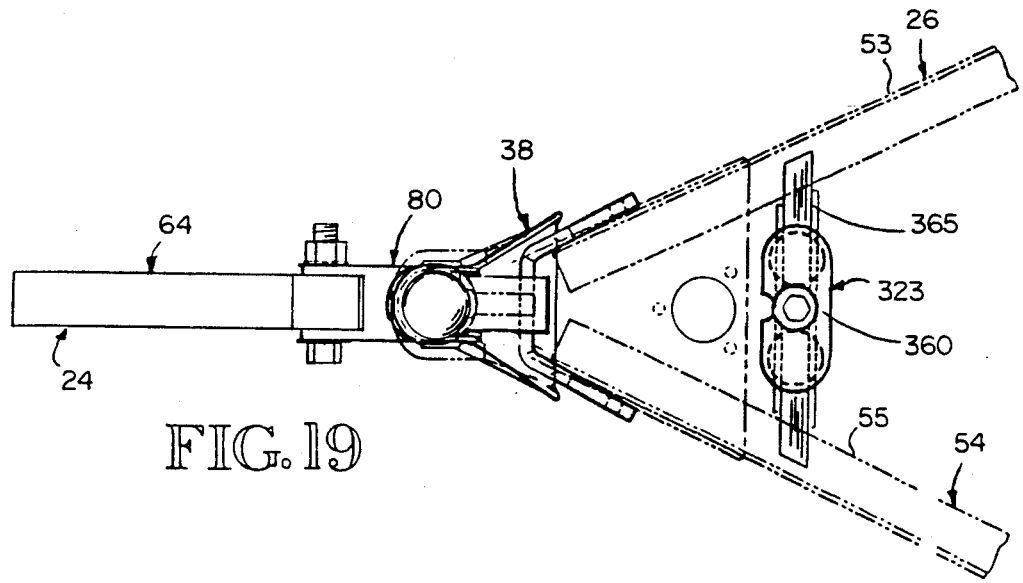
Figure 20:
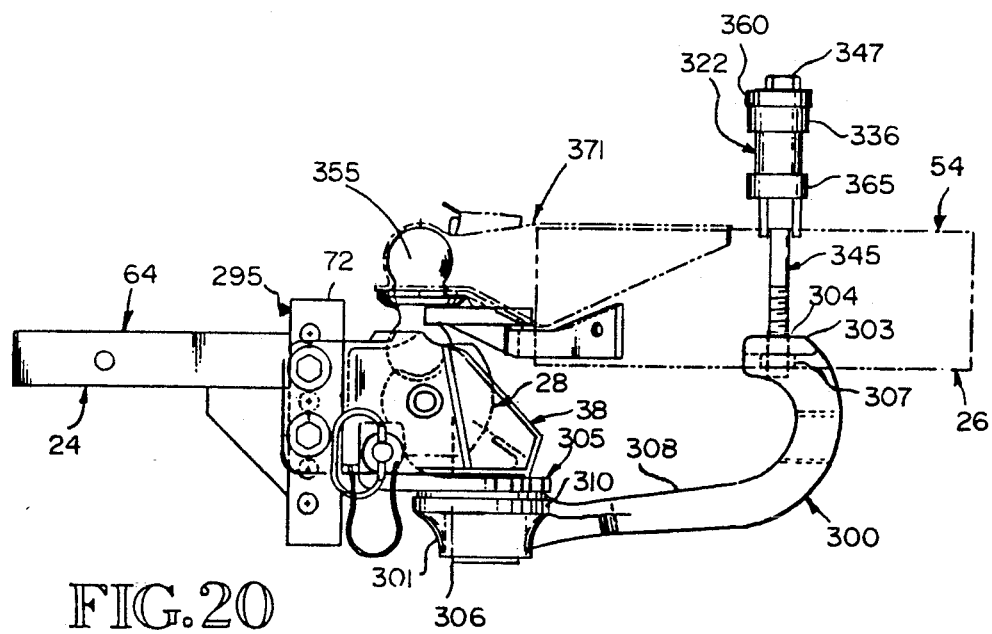
Figure 21:
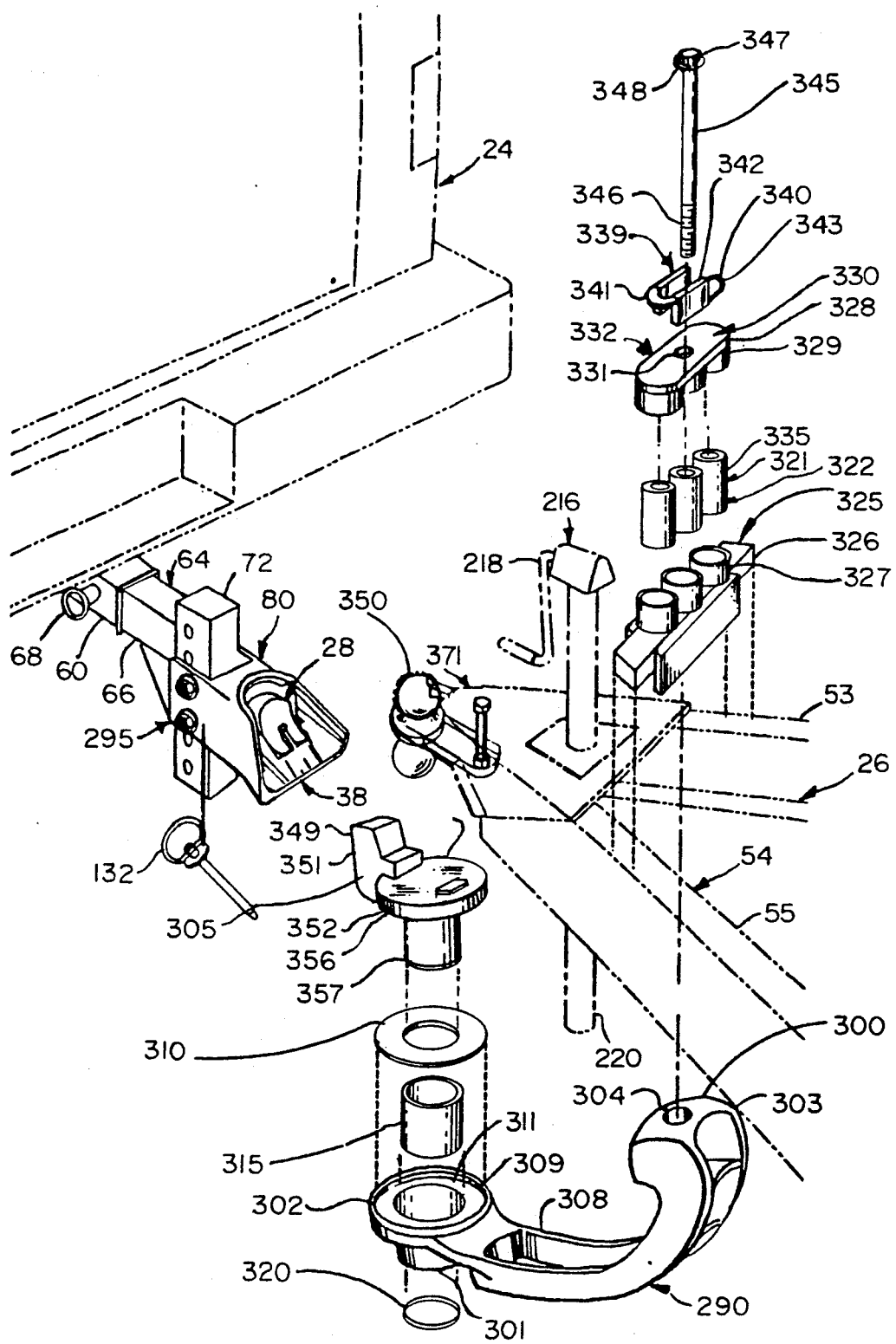
Figure 31:
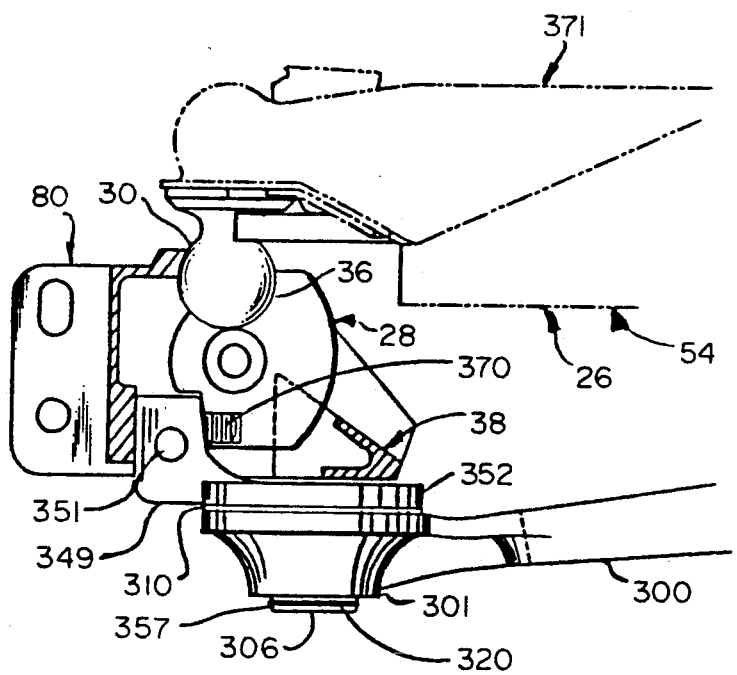
Figure 33:
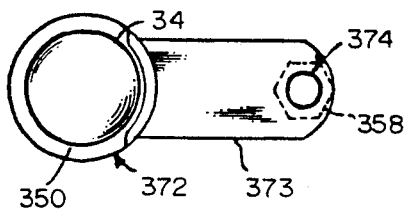
Figure 34:
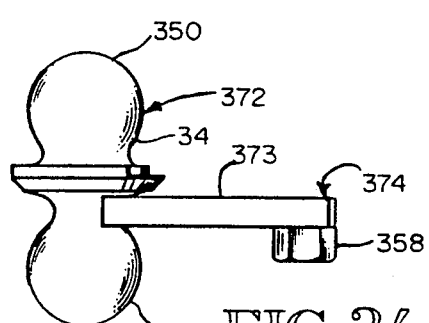
Figure 32:
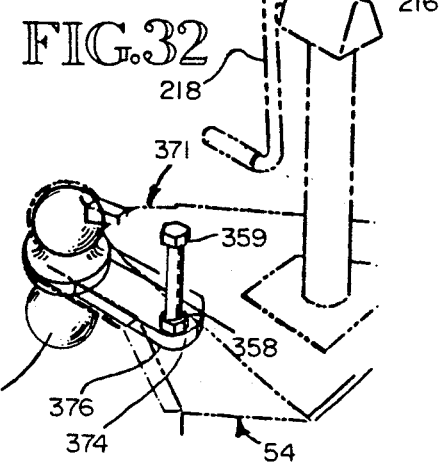
Figure 36:
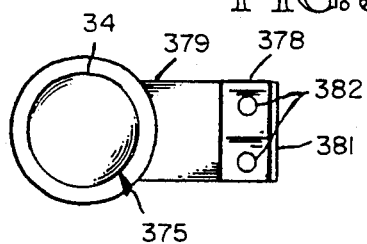
Figure 37:
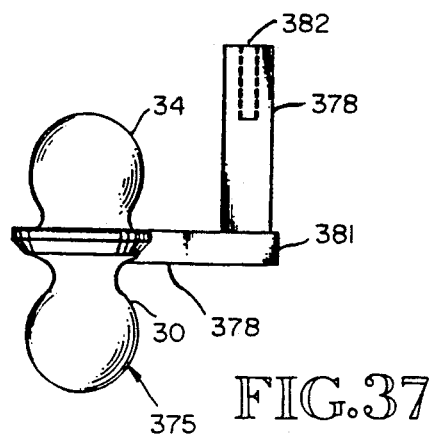
Figure 35:
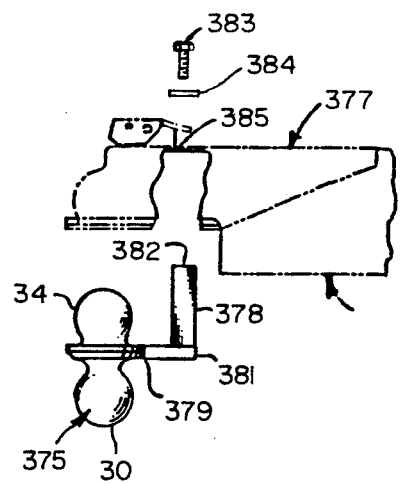
Figure 39:
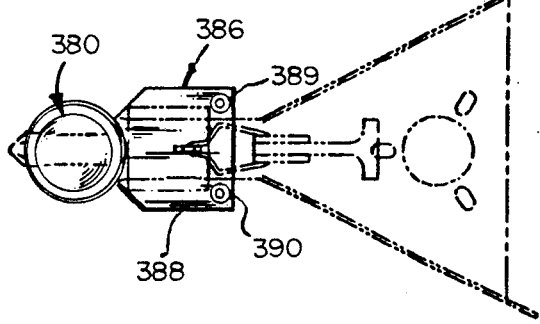
Figure 38:
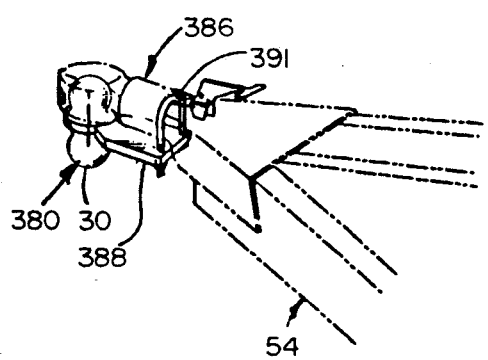
Figure 40:
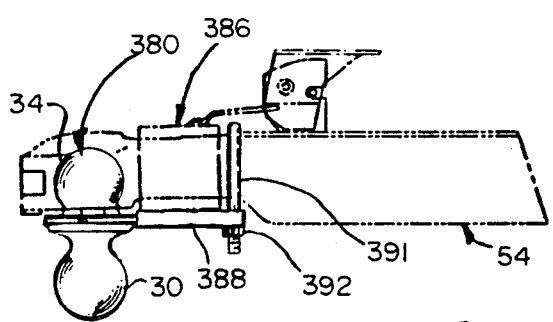
Figure 41:
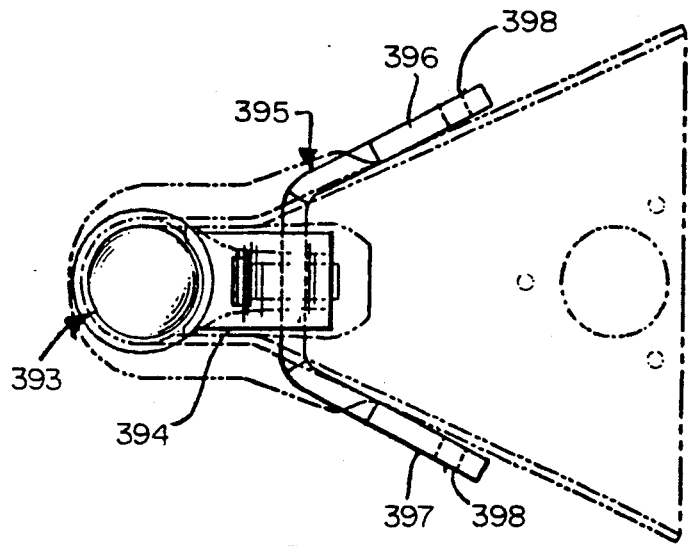
Figure 42:
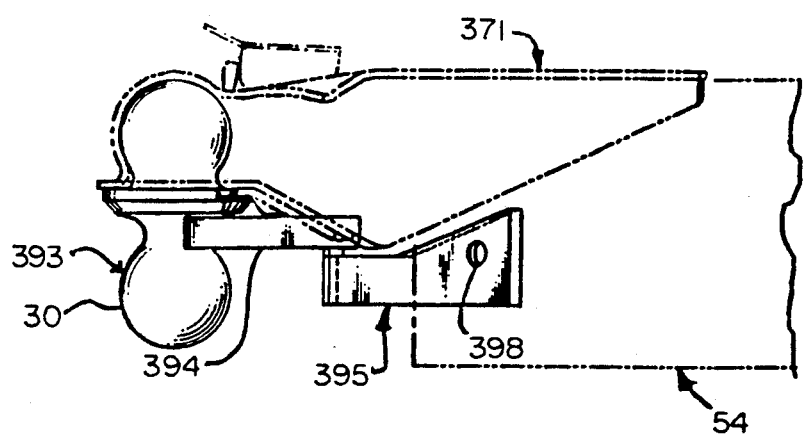

FIG. 18 is a perspective view of another embodiment of a load equalization assembly, having a three spring subassembly, used in combination with the basic components of this self aligning trailer hitch, showing in addition another embodiment of the arrangement of the upper ball and lower ball, having a positioner and strengthener unit, and also illustrating the incorporation of a sway resistor subassembly, and phantom lines indicate a trailer tongue, a jack, and a wood block;

FIG. 19 is a top view of somewhat the same combined basic components and a load equalization assembly, as illustrated in FIG. 18, but indicating a two spring subassembly, and another embodiment of an upper ball and lower ball having another positioner and strengthener unit;

FIG. 20 is a side view of the combined basic components and load equalization assembly illustrated in FIG. 19;

FIG. 21 is an exploded perspective view, with portions of the trailer tongue jack and towing vehicle illustrated in phantom lines, of the embodiment shown in the perspective view of FIG. 18, again showing the three spring subassembly;

FIG. 22 is a partial view, with phantom lines showing the trailer tongue, jack, and wood block, illustrating the use of a one spring subassembly, optionally used in place of the three spring subassembly, shown in FIGS. 18 and 21, or the two spring subassembly, shown in FIGS. 19 and 20, used in this embodiment of a load equalization assembly;

FIG. 23 is a partial transverse elevational view, and in reference to FIG. 22, indicates how this single spring of a load equalization assembly is arranged with the head of the bolt being positioned at a lower elevational position on the slider, during the early overall assembly procedures of hitching the towing vehicle to the towed vehicle;

FIG. 24 is a partial transverse elevational view, and in reference to FIGS. 22 and 23, indicates how this single spring of a load equalization assembly is arranged with the head of the bolt being positioned at the higher elevational position on the slider, during the late overall assembly procedures for the continued like placement thereof during the towing of a towed vehicle by a towing vehicle;

FIG. 25 is a perspective view of the equalizer arm used in the embodiments illustrated in FIGS. 18, 19, 20, 21, and 22, showing where it receives the equalizer bolt at the top and the lock lug, sway control disk, and sway control bearing at the bottom thereof;

FIG. 26 is a top view of the equalizer arm shown in FIG. 25;

FIG. 27 is a side view of the equalizer arm shown in FIGS. 25 and 26;

FIG. 28 is a perspective view of the lock lug used in the embodiments illustrated in FIGS. 18, 19, 20, 21, and 22;

FIG. 29 is a top view of the lock lug shown in FIG. 28;

FIG. 30 is a side view of the lock lug shown in FIGS. 28 and 29;

FIG. 31 is a partial elevational view, with portions removed, to illustrate how a claw adjusting screw is utilized, when necessary, to finally rotatively position the claw, when the lower ball has been fully received and constrained in preparation for towing;

FIG. 32 is a partial perspective view, with phantom lines indicating an "Atwood" socket subassembly for a trailer tongue, illustrating how the double balls are modified with a strengthener and positioner, and held also in place with a bolt and nut fastener assembly;

FIG. 33 is a top view of the "Atwood" arrangement shown in FIG. 32;

FIG. 34 is a side view of the "Atwood" arrangement shown in FIGS. 32 and 33;

FIG. 35 is a partial side view, with phantom lines indicating a "Franklin" socket assembly for a trailer tongue, illustrating how the double balls are modified with a strengthener and positioner, and held also in place with a fastener assembly;

FIG. 36 is a top view of the "Franklin" arrangement shown in FIG. 35;

FIG. 37 is a side view of the "Franklin" arrangement shown in FIGS. 35 and 36;

FIG. 38 is a partial perspective view, with phantom lines indicating a "Bulldog" socket subassembly for a trailer tongue, illustrating how the double balls are modified with a strengthener and positioner, and held in place with a fastener assembly;

FIG. 39 is a partial top view of the "Bulldog" arrangement shown in FIG. 38;

FIG. 40 is a partial side view of the "Bulldog" arrangement shown in FIGS. 38 and 39;

FIG. 41 is a partial top view illustrating how the double balls are modified with a strengthener and positioner when much higher towing loads, around ten thousand pounds, are being sustained during towing operations;

FIG. 42 is a partial side view of the modification illustrated in FIG. 41, showing the more extensive arrangement of the strengthener and positioner of the double balls.

Figure 44:
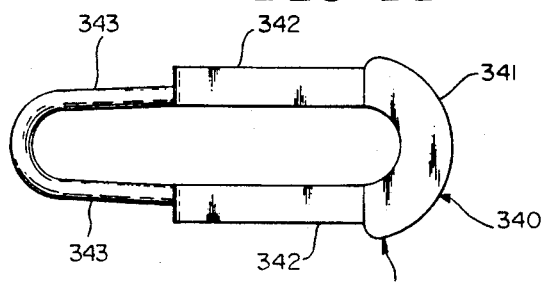
Figure 43:
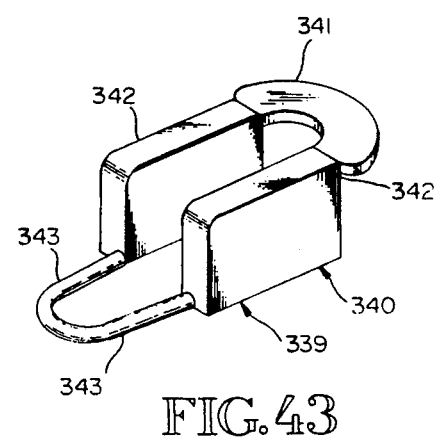

FIG. 43 is a perspective view of the slider, first shown in the exploded view of FIG. 21, illustrating the high spaced supports and the low spaced supports thereof, used to alternately position the head of the equalizer bolt, and also showing the finger gripping portion thereof, used in transversely manipulating this slider during the installation of the load equalizing assembly;

FIG. 44 is a top view of the slider shown in FIG. 43; and

Figure 45:
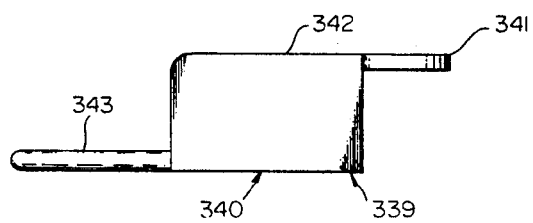

FIG. 45 is a side view of the slider shown in FIGS. 43 and 44.

DESCRIPTION OF PREFERRED EMBODIMENTS

Figure 1:
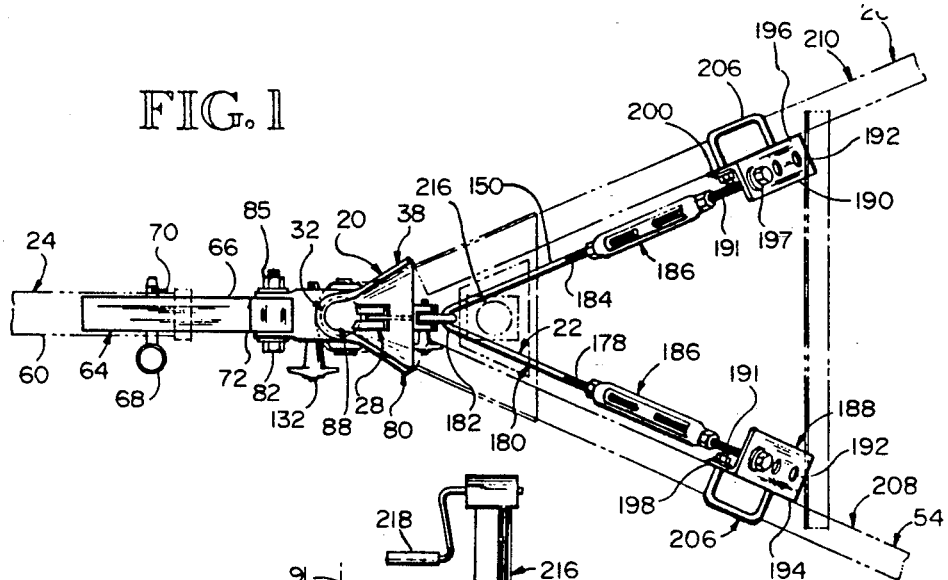
FIG. 1 is a top view of the self aligning trailer hitch and the load equalizing assembly shown installed and coupled, with phantom lines indicating the extending tube of the draft or tow bar assembly of a towing vehicle, and the tongue of a trailer and the trailer jack.
Figure 2:
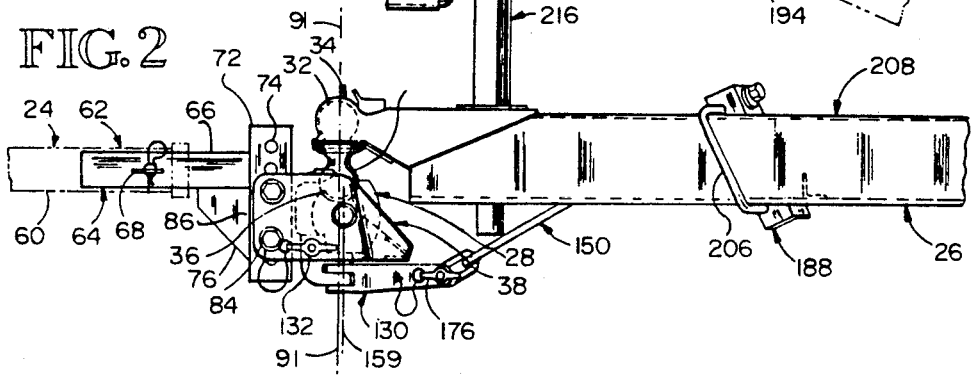
FIG. 2 is a side view illustrating the same components installed and coupled, as shown in FIG. 1.

A preferred embodiment of the self aligning trailer hitch 20 and the optionally used load equalizer 22 are illustrated in FIGS. 1 through 17 in the drawings. In FIGS. 1 and 2, they are shown as viewed respectively from the top and from the side, and as connected to a towing vehicle 24 and to a trailer 26, as further shown in FIGS. 15 and 16.

Other preferred embodiments, centering on another embodiment of a load equalizer 290 are illustrated in FIGS. 18 through 45.

Rotatable Claw and Vertical Pair of Balls

The self aligning trailer hitch 20 centers about the operation of a rotatable claw 28, which contacts a lower ball 30 of a vertically arranged pair of balls 32, which also includes the upper ball 34. After the essentially horizontal motion contact is made, the rotatable claw 28 rotates in a vertical plane about a horizontal axis, as shown in FIGS. 11, 12 and 13, to directly capture the lower ball 30 using the spherically shaped partial recess 36, also referred to as the capturing socket 36. The lower ball 30 during its capture does not drop down into a cavity. Instead the lower ball is moving essentially horizontally, encountering only a slight up and over center motion, as shown in FIGS. 11, 12, and 13.

When this rotatable claw 28 rotates during this coupling motion, it is transporting and repositioning the lower ball 30, which follows a radially upwardly movement path.

Later after the towing is completed, and decoupling is undertaken, the reverse rotation of the rotatable claw 28, to again reposition the lower ball 30, is undertaken without creating any hindering resisting frictional forces, as the lower ball 30 freely follows a radially downwardly movement path to arrive at the ball guiding ramp 38.

Ball Guiding Ramp

To insure this rotatable claw 28, as soon as possible, will be contacting the lower ball 30, the self aligning trailer hitch 20 has a three dimensional, non bindable, ball guiding ramp 38 to contact the lower ball 30, at the start of the coupling function, to guide the lower ball 30, as may be necessary, by redirecting the motion thereof either upwardly and/or sideways, as shown in FIGS. 11, 12, 13 and 14. This ball guiding ramp 38 has an entry ramp portion 40 and respective left and right side portions 42, 44, which commence at a wide mouth entrance 46 and thereafter converge to a narrow throat exit 48. There are integral curved transition portions 45 located between the entry ramp portion 40 and the respective left and right side portions 42, 44, having a radii that keeps the lower ball from being jammed on this ramp, to essentially, in effect, insure the lower ball 30 will only be contacting the non bindable guiding ramp 38 at one contact point at one time.

Figure 3:
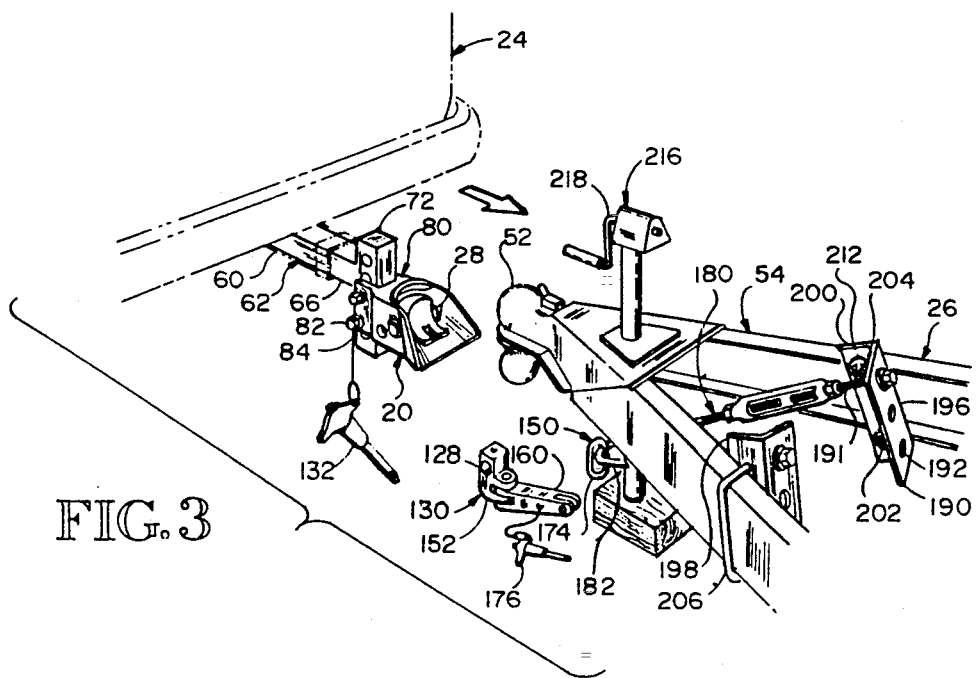
FIG. 3 is a perspective view of the self aligning trailer hitch and the load equalizing assembly installed but before being coupled, with removable portions spaced apart and with phantom lines indicating the rear bumper of the towing vehicle.

As particularly viewed in FIG. 4, and also shown in FIGS. 1, 3, and 6, as the lower ball 30 is being guided by the ball guiding ramp 38 to meet the rotatable claw 28, in reference to the spherical size of this lower ball 30, and to the greater spacing size of the ball guiding ramp 38, inclusive of the large enough radii of the transition portions 45, the lower ball 30 is only contacting at any one time only one of the following: the entry ramp portion 40 of the ball guiding ramp 38, left side portion 42 thereof, right side portion 44 thereof, or one of the integral curved transition portions 45 thereof. These respective sizes insure there will be no binding of the lower ball 30 in the three dimensional, non bindable, ball guiding ramp 38.

In recent years, the manufacturers' clearance has been reduced between where a trailer ball is coupled and the apex end of the trailer tongue and/or the frame members of a trailer. Therefore, there is a more limited space to accommodate the operational clear positioning of components such as this ball guiding ramp 38, when the towing vehicle and the towed vehicle are coupled up and underway.

Convenient Connection of Components of the Self Alignment Trailer Hitch to the Tongue of a Trailer The pair of balls 32, are integrally and vertically arranged with a mid cylindrical portion 50, presenting a flange like appearance, between the lower ball 30 and the upper ball 34. As shown in FIGS. 7 and 8, the upper ball 34 is inserted up and into the inverted socket 52, which is essentially permanently secured to the tongue 54 of the trailer 26, via the socket assembly 56, which also includes the latch 58 used to keep the upper ball 34 confined in the socket 52, and connected to the trailer 26.

Convenient Connection of Components of Self Alignment Trailer Hitch to the Tow Bar of a Towing Vehicle There are several parts which are similar to those parts currently used in other trailer hitches. As shown in FIGS. 1, 2, and 3, an extending tube 60 of a tow bar assembly 62, or draft bar assembly 62, is secured to a towing vehicle 24, by welding and/or bolting to vehicle frame members, not shown. A tow bar 64 has a horizontal leg 66, which telescopes into the extending tube 60 and is secured by using a loop headed shear pin 68, in turn retained by a cotter like safety pin 70. The tow bar 64 also has a vertical leg 72 creating an overall T shaped tow bar 64. A group of vertically spaced transverse holes 74 are provided in this vertical leg 72. A triangular reinforcing plate 76 is secured to be an integral part of the T shaped tow bar 64. This arrangement of the tow bar assembly 62, having the extending tube 60 and the T shaped tow bar 64 is like or very similar to like parts of other trailer hitches now in use.

Then as to the different parts which continue the convenience of the connection of this self aligning trailer hitch 20, a hitch head body 80 is provided to be bolted in place at a selected vertical height on the vertical leg 72 of the tow bar 64. Threaded bolts 82 are passed through the holes 84 of the channel receiving portion 86 of the hitch head body 80 and the selected holes 74 of the vertical leg 72, and thereafter these bolts 82 are secured by nuts 85.

This hitch head body 80 serves to position all the different components of the multiple piece socket assembly 88, as shown in FIGS. 1, 2, 3, 4, 5, and 6. There is a central receiving cylindrical like volume 90, having a vertical centerline 91, to receive the lower ball 30 above and to receive the rotatable claw 28 below in the lower ball receiving position. Upon the hitching of the towing vehicle 24 and the trailer 26 and change of position of the rotatable claw 28, the upper portion of this volume 90 takes on a spherical volume appearance to receive and to hold the lower ball 30. The rotatable claw 28 is rotatably secured by using a transverse shaft 92, passed through the holes 94, 96, which is retained, via the shaft head 98 and the hair pin shaped keeper 100, which is inserted in the radial hole 102.

This hitch head body 80 is integrally formed to include the ball guiding non bindable ramp 38, having the entry portion 40, the left and right side portions 42, 44, arranged to have a wide mouth entrance 46 and a narrow throat exit 48. As previously described, oftentimes today there is less clearance available between where a trailer ball is coupled and where the apex of the trailer tongue is located, and consequently often less clearance in reference to trailer frame members. Therefore to decrease the longitudinal length needed of the ball guiding ramp 38, the entry portion 40 is integrally formed to include a recess 104, through which rotatable claw portions 106 pass during the upward rotation of the claw 28.

An integral central gusset 108 of the ball guiding ramp 38, bisects the recess 104, creating the spaced side by side openings 110, 112, which then comprise the recess 104. The rotatable claw 28 has complementary spaced side by side claw portions 113, 114, which rotatably pass through the spaced side by side openings 110, 112. The integral central gusset 108 protectively guides the upward motion of the lower ball 34 during the coupling of the towing vehicle 24 and the trailer 26. Such protective guiding, via the integral gusset 108, avoids any possibility of an initial or follow on jamming of the lower ball 30 upon its entry into its trailering position when guided by this shortened ball guiding ramp 38.

The hitch head body 80 integrally provides a spherical recessed surface 116, at the top 118 of the central receiving cylindrical like volume 90, also referred to as the central receiving volume 90, to receive a sufficient portion of the lower ball 30 to stop the entering motion thereof. This spherical recessed surface 116 is another portion of the multiple piece socket assembly 88, which eventually presents a spherical appearing volume at this top 118.

Also the hitch head body 80 integrally provides a vertical planar receiving and abutment surface 120 at the bottom 122 of the central receiving cylindrical like volume 90, also referred to as the central receiving volume 90. This vertical planar receiving and abutment surface 120, along with a right angled locking notch 124, in the rotatable claw 28, define a lock receiving volume 126, when the rotatable claw 28 is rotated upwardly and the lower ball 30 is in the capturing socket 36.

A locking insert member, is designated as a locking lug 128, and the upwardly directed placement of this locking lug 128 in the lock receiving volume 126, secures the rotatable claw 28 in place, when the lower ball 30 is in the capturing socket 36. This locking insert member 128 is an upstanding portion 128 of a pivoting link assembly 130. The locking insert member 128 is kept in its upward position by using a transversely placed quick pin 132 passed transversely through horizontally spaced holes 134, 136 in the hitch head body 80.

The hitch head body 80 with the integral spherical recessed surface 116, and the capturing socket 36, also referred to as the spherical partial recess 36 of the rotatable claw 28, together become the multiple piece socket assembly 88, to receive the lower ball 30.

The Horizontally Directed Coupling of the Lower Ball Secured to the Trailer Tongue to the Multiple Piece Socket Assembly Secured to the Tow Bar Assembly of the Towing Vehicle As shown in FIGS. 7 through 10, the pair of balls 32, via the upper ball 34 are inserted in the inverted socket 52 on the tongue of trailer 54, and secured by the latch 58, as shown in FIGS. 7 and 8. Or alternatively, a heavy duty embodiment 140 of a pair of balls 30, 34, are inserted in the inverted socket 52 on the tongue of a trailer 54, and secured both by the latch 58, and also by using the strong, clip like retainer 142, as shown in FIGS. 9 and 10.

Then with rotatable claw 28 rotated fully downwardly, as freely occurs via the weight distribution of this rotatable claw 28, the spherical partial recess 36, also referred to as the capturing socket 36 is positioned to horizontally receive the lower ball 30, as shown in FIG. 11.

The motion arrows indicate, throughout FIGS. 11, 12, and 13, the approaching of the rotatable claw 28 of the tow bar assembly 62, on the towing vehicle 24, being backed toward the lower ball 30 of the pair of balls 32 held in the inverted socket 52, via the upper ball 34 and latch 58, on the tongue 54 of the trailer 26. In FIG. 12, the lower ball 30 is shown making the essentially initial contact with the capturing socket 36 of the rotatable claw 28. Then in FIG. 13, the lower ball 30, while still remaining in contact with the capturing socket 36, has contacted the integral spherical recessed surface 116 of the hitch head body 80 located at the top 118 of the central receiving volume 90 of the hitch head body 80. At this full longitudinal motion hitching time, the finger portions or claws 144, 146, of the rotatable claw 28, have blocked the return horizontal exit of the lower ball 30. Also they have blocked the upper vertical raising of the lower ball 30, in cooperation with the spherical recessed surface 116, integrally formed in the hitch head body 80. Then the capturing socket 36 also has blocked the lower vertical dropping of the lower ball 30. Moreover, the spherical recessed surface 116 continues to block the horizontal advance of the lower ball 30. Therefore this multiple piece socket assembly 88, as shown in FIG. 13, securely positions the lower ball 30 in respect to all possible directions of possible movement.

To insure there will be no counter rotation of the only moving part of this multiple piece socket assembly 88, the movable rotatable claw 28, via its slightly tapered near right angled locking notch 124, is locked into position by the like slightly tapered locking insert 128, or locking lug 128. The locking insert 128 is held in the locking position by the quick pin 132, as shown in FIG. 13.

During the horizontal motion of the coupling, any reasonable misalignment is corrected as the lower ball 30 is guided by the ball guiding ramp 38, in a non binding way, as shown in FIG. 14. The entry portion 40, and the left and right side portions 42, 44 cooperatively guide the lower ball 30 to the capturing socket 36 of the rotatable claw 28. Below the entry portion 40 in a horizontal portion presenting a rub surface 219.

When the Equalization of the Loads is Undertaken to Result in the Substantial Leveling of Both the Towing Vehicle and the Trailer, Then a Load Equalizing Assembly is Used Having a Wishbone Equalizing Bar Sub Assembly.

As illustrated in FIGS. 15 and 16 load equalizing or load equalization 22 is undertaken, when a load equalizing assembly 150 is installed. As shown in FIGS. 3, 6, and 13, when the load equalizing assembly 150 is to be installed, then the pivoting link assembly 130, having the locking insert 128, which also serves as a locking lug in part, is utilized, in lieu of just the locking lug 128. It is retained in position by the quick pin 132, and serves to keep the rotatable claw 28 in its lower ball 30 retaining position, as shown in FIG. 13.

The pivoting link assembly 130, has a link body portion 152 integrally supporting the locking insert 128 and integrally presenting spaced top and bottom aligned hinge or bearing portions 154, 156, presenting vertically aligned holes 158, which are on the vertical center line 91 of the central receiving volume 90 of the hitch head body 80. Then when the lower ball 30 is in its captured position, the vertical center line 91 also passes through the center of the lower ball 30. This center line 91 is offset from the parallel center line 159 passing through the shaft 92 for the rotatable claw 28, by five sixteenths of an inch in an embodiment. Thereby the lower ball 30 is in an over center position during the towing operational times.

With the lower ball 30 on this vertical center line 91 along with pivot location of the pivoting link assembly 130, the rotation of the trailer tongue 54 and the rotation of the load equalizing assembly 150 are desirably both positioned to rotate about this vertical center line 91.

Also the over center position of the lower ball 30 on vertical center line 91 ahead of the shaft 92 of the rotatable claw 28 on the parallel vertical center line 159, is very useful during the hitching operation. When the towing vehicle has an automatic transmission and the driver completes the first coupling step, while the transmission is in the drive position, then when he or she places the transmission in the park position, the vehicle tends generally to move slightly. However, this slight movement does not successfully tend to decouple the lower ball 30, as it might otherwise, because this over center first coupling of the lower ball 30, following the vertical rotation of the rotatable claw 28, serves to keep the lower ball 30 retained in place, during the automatic transmission's characteristic caused movement of the vehicle, when shifting occurs from the reverse position to the park position. This non movement of the lower ball 30 is maintained, even though the driver has now left his or her driver's seat to come back to this self aligning trailer hitch to complete his or her physical upwardly insertion of the locking insert 128, and the following horizontal insertion of the quick pin 132.

It is to be noted, that when the locking insert 128 is part of the entire hook up of the load equalizing assembly 150, which it is, when such an assembly 150 is to be installed, then this locking insert 128 must be raised up and inserted and the quick pin 132 must be inserted by the driver to complete both the entire coupling and the securement of the equalization assembly. This procedure required of the driver insures that the lower ball 30 will be carrying the main coupling load, and the load equalizing assembly 150 will not be carrying the main coupling load. In reference to other trailer hitches, their load equalizing assemblies have unexpectedly carried the main coupling load, causing an unwanted very dangerous unsatisfactory towing coupling condition which may fail when towing is underway.

The pivoting link assembly 130, also includes a horizontal connector bar 160 having at one end integral spaced top and bottom aligned hinge or bearing portions 162, 164, presenting vertically aligned holes 158, which, when complementary fitted between and with the spaced top and bottom aligned hinge or bearing portions 154, 156 of the link body portion 152, are also on the vertical center line 91. They are then rotatably joined by using the vertically positioned headed shaft 166, which passes through all the alike vertically aligned holes 158.

At the other end of the horizontal connector bar 160, there are integral side by side spaced bearing portions 168, 170 presenting horizontally aligned holes 172. The spacing permits the controlled entry of portions of a chain link 174, which is then held in place by another transverse quick pin 176. The top surface of the connector bar 160 rubs against the rub surface 219, eliminating high stress at pin 166 in parts 128 and 160, and creating anti-sway resisting forces during towing.

The chain link 174, before its retention by the quick pin 176, has been placed over an end 178 of a wishbone equalizing bar 180 of a V shape, and moved to the apex 182 of the V. Therefore the connection of the chain link 174 to the connector bar 160 of the pivoting link assembly 130, also connects the V shaped wishbone equalizing bar 180 to the tow bar assembly 62 of the towing vehicle 24.

The respective widely spaced threaded ends 178, 184 of the V shaped wishbone equalizing bar 180 are preferably each connected to turnbuckle assemblies 186, which are secured respectively to left and right anchor clips 188, 190, using threaded bar sections 191 passing through selected holes 192, in respective groups of spaced holes 192, in respective projecting flanges 194, 196 of the angle anchor clips 188, 190, and then are secured by bolts 197. The other flanges 198, 200 of the angle anchor clips 188, 190, have spaced holes 202, which receive the threaded ends 204 of U-bolts 206. These U-bolts are respectively passed about the left and right channels 208, 210, of the trailer tongue 54, and then their threaded ends 204 are respectively passed through the spaced holes 202 in the other flanges 198, 200. Thereafter they are secured by the nuts 212 threaded on the threaded ends 204 and tightened.

When a towing vehicle 24 and a trailer are first equipped with all the components of this self aligning trailer hitch 20, only then is the securement undertaken of this V shaped wishbone 180, with the chain link 174 in place. The anchor clips 188, 190 once secured to the trailer tongue 54 by the U-bolts 206 and nuts 212, so remain secured for subsequent travels. The threaded ends 178, 184 of the V shaped wishbone 180 remain secured to the anchor clips 188, 190, via the turnbuckle assemblies 186, the threaded bar sections 191 and the nuts 197. Only must the chain link 174 be connected to the horizontal connection bar 160, each time the trailer 26 is to be load equalized with respect to the towing vehicle 24, as the final step is undertaken by using the quick pin 176.

As shown in FIGS. 15 and 16, after the lower ball 30 has been captured in the multiple piece socket assembly 88 upon the rotation of the rotatable claw 28 and the locking thereof, the trailer jack 216, upon turning of the crank handle 218, is used to raise the tongue 54 of the trailer 26. While remaining in this raised position, the chain link 174 is positioned with respect to the horizontal connection bar 160 and connected thereto via the quick pin 176 passing through the holes 172 of the spaced hinge or bearing portions 162, 164 and the chain link 174.

Then while and after the trailer jack is lowered, the load equalizing assembly 150 becomes effective in leveling both the towing vehicle 24 and the trailer 26. Only during the initial hook up of a paired towing vehicle 24 and a trailer 26 will all the other fastening steps be required. In general, then when a particular towing vehicle 24 and a particular trailer 26, during an overall trip are intentionally separated at a stopover locale, in respect only to the load equalizing assembly 150, the only disconnect will be the clearing of the chain link 174 by the withdrawal of the quick pin 176.

Also to be remembered, the locking insert 128 portion of link body portion 152 of the pivoting link assembly 130 must be cleared, after first removing the quick pin 132. Then the rotatable claw 28 is free to reversely rotate, as the towing vehicle 24 is pulled forward clear of the trailer 26. Also the safety chains, not shown, must be cleared. Moreover, the electrical connections (not shown) for the lighting of the trailer 26, must be disconnected.

Independent of the time periods required for these chain connections and electrical connections, this self aligning trailer hitch 20 is very quickly aligned and coupled for a trip. If load equalization 22 is undertaken, the load equalizing assembly 150, previously, essentially, and substantially, arranged and connected during the first pairing of a towing vehicle 24 and a trailer 26, is quickly finally secured, via using the chain link 174 with the pivoting link assembly 130. Also during the coupling the ball guiding ramp 38 quickly redirects, aligns, and directs the horizontal motion entry of the lower ball 30 into captive retainment, via the motion of the rotatable claw 28, within the multiple piece socket assembly 88, to quickly complete a very secure coupling of this self aligning trailer hitch 20. The towing vehicle 24 and the trailer 26 remained coupled, and if a load equalizing assembly 150 has also been quickly interconnected, then the towing vehicle 24 and the trailer 26 remain essentially level on level roadways. The uncoupling is likewise quickly undertaken.

The equalizing assembly 150 is arranged with the V shaped wishbone 180 being in tension, and not under bending stresses. The pivoting of the equalizing assembly 150 is about the centerline 91, which also passes through the center of the lower ball 30 and the upper ball 34, when the coupling is complete. Therefore there are no off center torque arms present to create any unwanted reactive forces.

When the towing vehicle 24 and the trailer 26 are so coupled, with this self aligning trailer hitch 20, the resulting driving, handling and riding of the overall coupled vehicles are very satisfactory in respect to all roadway surfaces and contours.

The Load Equalizing Assembly Is Useful With Other Trailer Hitches

In FIG. 17, the load equalizing assembly 150 is shown in greater detail for two purposes. One purpose is to illustrate how this assembly 150 may be used with a prior art trailer hitch. The other purpose is to illustrate, in reference to FIGS. 15 and 16, how this load equalizing assembly 150 is secured to the pivoting link assembly 130 as shown in FIGS. 15 and 16.

Another Load Equalizing Assembly of Another Overall Self Aligning Trailer Hitch

In respect to other embodiments of components used in conjunction with the basic configuration of the double balls 32, the vertical rotatable claw 28, and the ball guiding ramp 38, another preferred load equalizing assembly 290 is illustrated in FIGS. 18, 19, 20, and 21 assembled or about to be assembled with other components of an overall self aligning trailer hitch 295. In FIGS. 22 through 45 various different components in their different embodiments are illustrated.

In FIG. 21 the components of this overall self aligning trailer hitch 295 are illustrated spaced apart, before their assembly, as shown in FIG. 18. The components assembled and secured to the towing vehicle are the same as shown in FIGS. 1, 2, and 3, with respect to the first embodiment. They are, for example, the ramp 38, the rotatable claw 28, the hitch head body 80, the quick pin 132, and the tow bar assembly 62, having the extending tube 60 and the vertical leg 72.

In respect to the vehicle to be towed, there is the trailer tongue 54 having a receiving socket assembly 52, such as the "Atwood" assembly 52, and the trailer jack 216, just as shown previously in FIGS. 1, 2, and 3. However, the components of the load equalizer assembly 290 are all different. There is an equalizer arm 300 specifically illustrated in FIGS. 18, 20, 21, 25, 26, and 27, which is curved in a vertical plane. At the lower forward end 301 thereof, there is a step down central recess 302, first receiving a large diameter sway control friction disc 310, made of polyurethane, and then a smaller diameter sway control bearing 315, and then a depending shaft 306 of a lock lug 305. A retainer ring 320 retains the shaft or axle 306 in place in the step down central recess 302 of this equalizer arm 300.

At the higher end 303 of this equalizer arm 300 is a hole 304 to receive the threaded lower end 346 of an equalizer bolt 345. The hole 304 is threaded, or a nut 307 is secured in line with the hole 304, to fasten this equalizer bolt 345 in place. The head 347 of this bolt 345 is large enough in diameter to provide a circumferential bearing surface 348 on the bottom of the bolt head 347. Also this equalizer arm 300 has a central longitudinally orientated recess 308, which during the hitching operations, accommodates the passage of the jack post or supporting leg 220 of the trailer jack 216.

The higher end 303 of the equalizer arm 300 is supported from the trailer tongue 54 by using one of several embodiments of an equalizer spring assembly 321. In the three spring embodiment 322, illustrated in FIGS. 18 and 21, a bottom spring housing 325 has a lower transverse body 326 fitted on and between the converging members 53, 55 of a trailer tongue 54. On the top of this transverse body 326 are three spaced lower upstanding cylindrical receivers 327 to position the bottom portions of equalizer springs 335. They are made of a heavy duty rubber like shock absorbing material. The top portions of these hollow cylindrically formed equalizer springs 335 are positioned by top spring housing 330, having an upper transverse body 328, and three spaced upper depending cylindrical receivers 329.

A two position transverse movement slider 340 is slidably placed on the upper transverse body 328, as shown in FIG. 18, and as indicated in FIG. 21. How this slider 340 is specifically made is illustrated in FIGS. 43, 44, and 45. There is a finger tab 341, a pair of higher elevation spaced supports 342, and a pair of lower elevation spaced supports 343, to respectively position the head 347 of the equalizer bolt 345, using the circumferential bearing surface 348 thereof.

There are aligned central holes 331 in the top spring housing 330, and the bottom spring housing 325. The equalizer bolt is dropped down through the spaced supports 342, 343 of the slider 340, through the central hole 331 in the top spring housing 330, through the hollow center of the center equalizer spring 335, through the central hole 331 in the bottom spring housing 330, through the hole 304 of the higher end 303 of the equalizer arm 30, and then threaded into the nut 307 on the equalizer arm 300.

During assembly and adjustments of this load equalizer assembly 290, the bolt head 347 is supported on the lower elevation supports 343 of the equalizer slider 340. Then during the final positioning and subsequent tightening, the bolt head 347 is supported on the higher elevation supports 342 of the equalizer slider 340.

Other Embodiments of Equalizer Springs, Housings Therefor and Sliders

In addition to the three spring embodiment 322 shown in FIGS. 18 and 21 of an equalizer spring assembly 321 using the equalizer slider 340 specifically shown in FIGS. 18, 21, 43, 44, 45, there are other embodiments of both equalizer spring assemblies 321 and equalizer sliders 339. In FIGS. 19 and 20, the equalizer spring assembly 321, is referred to as a two equalizer spring assembly 323, having two spaced apart cylindrical equalizer springs 336, a two spring top housing 360 and a two spring bottom housing 365.

In FIGS. 22, 23, 24, an equalizer spring assembly 321 is referred to as a one equalizer spring assembly 324, having one rectangular equalizer spring 405, with a central hole 406 to receive the equalizer bolt 345. This spring 405 is received and supported by a channel shaped bottom spring housing 400, having upturned flanges 401 to position this spring 405, and having a centered hole 402 to accommodate the insertion of the equalizer bolt 345.

The functions of an equalizer slider 339, in general, and the top spring housing 312, in general, are combined in what is called the integral channel combination 410 of the slider portion 411 and the top spring channel housing 412. This combination 410, also has a transverse elongated opening 413 to receive the equalizer bolt 345 in two relative transverse positions. Also this combination 410 receives the head 347 of the bolt 345 at a lower elevation on top surface 414 of the top spring channel housing 412 thereof, as shown in FIG. 23. Then this combination 410 has two spaced transverse upstanding supports 416 made integral with the top surface 414 of the top spring channel housing 412 to receive the head 347 of the bolt 345 at a higher elevation, as shown in FIG. 24, when this equalizer bolt 345 is supporting the equalizer arm 300 at the higher end 303 thereof, where the nut 307 is preferably secured in place. During most of the time of the overall assembly time of this load equalizer assembly 290, the combination slider 410 is in the position illustrated in FIG. 23 supporting the bolt head 347 at a lower elevation. At the conclusion of the hitching time of a towing vehicle to a towed vehicle, the combination slider 410 is in the position shown in FIG. 24, supporting the bolt head 347 at a higher elevation, and consequently supporting the higher end 303 of the equalizer arm 300 at a higher elevation, when the load is being equalized between the towing vehicle 24 and the towed vehicle 26.

The Equalizing Arm

The equalizer arm 300 of this overall self aligning trailer hitch 295 as stated previously, is specifically illustrated in FIGS. 25, 26, and 27. It is curved into a somewhat C shape, having a higher rear end 303 equipped with a threaded nut 307 and a hole 304 to receive and to hold the lower threaded end 345 of the equalizer bolt 345. A central longitudinal orientated recess 308 in this equalizer arm 300 accommodates the passage of the jack post 220 of a trailer jack 216, during hitching operations.

At the lower forward end 301 of this equalizer arm 300 is the step down recess 302, having a larger diameter receiving space 309 at the top to position the sway control disk 310, and a lower depending smaller diameter receiving space 311 to position a cylindrical sway control bearing 315, in turn receiving a shaft 306 of a lock lug 305.

The Lock Lug

The lock lug 305 is specifically illustrated in FIGS. 28, 29, and 30. The lug portion 349, as shown in FIGS. 20 and 31, when in the inserted position thereof, locks the vertical rotatable claw 28 in the fully retaining position thereof, to firmly hold the lower ball 30 in the trailer load carrying position thereof.

As also shown in FIG. 31, a claw adjusting screw 370, is threadably positioned in the vertical rotatable claw 28 to bear against the lug portion 349. This claw adjusting screw 370 is positioned, to in turn position the spherical partial recess 36 of the vertical rotatable claw 28 as snugly and as fully as possible against the lower ball 30 during the full hitching position of the components of this load equalizer assembly 290. Adjustment of this screw 370 is used in creating a tolerance and later to compensate for wear.

The transverse hole 351 in the lug portion 349 receives the quick pin 132 which holds the lug portion 350 in place in the hitch head body 80.

The lock lug 305 has the integral bearing and positioning disk portion 352. The planar top surface 353 of this disk portion 352 has a slightly raised spacing and rubbing portion 354. Together they face upwardly to the bottom of the hitch head body 80. The planar bottom surface 356 of this disk portion 352 bears against the friction producing sway control disk 310.

The lock lug 305 has the integral depending shaft 306 which passes through the sway control bearing 315 in the lower forward end 301 of the equalizer arm 300, as indicated in FIG. 21. When this depending shaft 306 is so positioned, a retainer ring 320 is snapped into place in the ring receiving groove 357 at the bottom of this depending shaft 306, as shown in FIG. 31.

Different Embodiments of the Positioners of the Double Ball Having the Upper Ball and Lower Ball Because of different manufacturers making many components such as the inverted socket 52 secured to a trailer tongue 54, and also because of different towing loads being undertaken, several different embodiments of positioners of the double balls, or pair of balls 32, having the upper ball 34 and lower ball 30, are available. These various embodiments are illustrated in FIGS. 32 through 42.

In FIGS. 32, 33, and 34, the "Atwood" socket assembly 371 is illustrated, showing how the "Atwood" styled assembly 372 of the pair of balls 32 includes a secured horizontal rearward extending positioning bar 373, having a hole 374, and threaded nut secured to it, to receive a positioning bolt 359, passing down through a hole 376 in the "Atwood" socket assembly 371.

In FIGS. 35, 36, and 37, the "Franklin" socket assembly 377 is illustrated, showing how the "Franklin" styled assembly 378 of the pair of balls 32 includes a secured horizontal rearward extending positioning bar 379, having an upstanding vertical positioning bar 378 secured to the rearward end 381 of this horizontal positioning bar 379, and equipped with two alike spaced threaded holes 382. Two positioning bolts 383, each with a washer 384, are dropped down through holes 385 in the "Franklin" socket assembly 377 and threaded into the holes 382 to secure in place this "Franklin" styled assembly 378.

In FIGS. 38, 39, and 40, the so called "Bulldog" socket assembly 386 is illustrated, showing how the "Bulldog" styled assembly 380 of the pair of balls 30 and 34 includes a secured horizontal rearward extending positioning bar 388, having like spaced receiving holes 389 at the rearward end 390 thereof. A U shaped threaded clamp fastener 391 with the two alike nuts 392, is used to secure this "Bulldog" styled assembly of the paired balls 380 to the "Bulldog" socket assembly 386.

In FIGS. 41 and 42, again in respect to illustrating an "Atwood" socket assembly 371, but other such assemblies could be considered, is shown in conjunction with a high towing load styled assembly 393. This very strong assembly 393, includes the pair of balls 355 built to handle a ten thousand pound towing load and having a secured horizontal positioner bar 394 as shown in FIGS. 19 and 20. This bar 394 in turn is secured to positioning bracket 395 having rearwardly diverging legs 396, 397 to extend respectively along the converging frame members 53, 55 of the trailer tongue 54, and be bolted in place using holes 398.

The Assembly of the Load Equalizer Assembly and the Overall Self Aligning Trailer Hitch At the very outset of the preparation of the towing vehicle 24, the same preparations will be undertaken, as occur when the other embodiment 20 of the self aligning trailer hitch is to be utilized. The towing vehicle 24 is equipped with a draft bar assembly 62 also referred to as a tow bar assembly 62 having an extending tube 60, also referred to as a receiver 60. These assemblies include a T shaped tow bar 64 having a horizontal leg 66 and a vertical leg 72, as shown in FIGS. 1, 2, and 3, and FIGS. 18, 19, 20, and 21. The hitch head body 80 is adjustably secured to the vertical leg 72 at the right height in respect to the particular towed vehicle 26, often a trailer 26. Included with the hitch head body 80 is the vertical rotatable claw 28, and the ball guiding ramp 38. The major components with their respective fasteners include all the components which are carried by the towing vehicle 24, before the hitching operation begins.

The components of the balance of this overall self aligning trailer hitch 295, having this load equalizer assembly 290, are secured to the trailer tongue 54 to be carried by the towed vehicle 26, before the hitching operation begins. The various embodiments of these components are selected depending on what the towing loads will be, and what manufacturer's components have already been installed on the towed vehicle 54, such as the "Atwood", "Franklin", and "Bulldog" components.

The pair 32 of the upper ball 34 and lower ball 30, or the pair 355 of stronger balls are inserted, via the respective upper balls, into the respectively selected inverted sockets 52, 371, 377, or 386. Their respective positioners are secured to "Atwood", "Franklin", or "Bulldog", components, or to the tongue 54 of the trailer 26 or towed vehicle 26.

Then the equalizing arm 300 is secured at the higher rear end 303 thereof to the tongue 54 of the towed vehicle 26, using the equalizer bolt 340, and a selected equalizer spring embodiment. The lower forward end 301 is fitted with the sway control bearing 315, the sway control disc 301, and the lock lug 305.

At this time the towed vehicle, located preferably on a level or near level ground area, has the wheels thereof well blocked. Then the towing vehicle 24 is backed slowly until the vertical rotating claw, via the guiding ramp 38, receives the lower ball 30, then traveling in a horizontal direction, and moves this ball 30 in a vertical arc to an over center hitched location. The towing vehicle 24 is stopped and held in position by brakes, and either a low gear shift location, or a park automatic transmission position.

Thereafter the trailer jack is utilized to raise the tongue 54 of the towed vehicle 26, and consequently raise the rear of the towing vehicle, as shown in FIG. 15. While these various components remain in their raised positions, and the bolt head 347 of the equalizer bolt 345 is in the lower position thereof, the lug portion 349 of the lock lug 305 is inserted into the hitch head body 80 to lock the rotatable claw in position. The quick pin 132 is inserted to maintain this positioning of the lug portion 349, indirectly the positioning of the vertical rotatable claw 28, thereby assuring the direct ball and socket coupling of the towed vehicle 26 to the towing vehicle 24.

Then the trailer jack 216, via turning of the handle 218 thereof is operated to withdraw the jack post 220 to its full road clearance position, transferring all the loads to the self aligning trailer 29. Thereafter the selected equalizer slider 339 is moved to position the bolt head 347 to the higher elevation thereof, and then the bolt is tightened to complete the load equalizing provided by using this load equalizing assembly 290.

After the first hitching of a towed vehicle 26 to a towing vehicle, and if these same vehicles are again to be hitched together, then most of the assembly steps first undertaken do not have to be repeated again. When these vehicles are to be separated, yet soon to be hitched together, and they are on level ground, brakes on, low gear in place, or park position completed, towed vehicle wheels blocked, then the trailer jack is utilized to raise the hitching components. Thereafter the quick pin 132 is removed, the lug portion 349 is removed and the load equalizer assembly 290 is cleared. Thereafter the trailer jack is lowered so the lower ball 30 will readily clear from the hitch head body 80, upon the reverse rotation of the vertical rotatable claw 28, when the towing vehicle 24 is moved forward.

At all times if safety chains are utilized they will be secured in place before the hitched vehicles are moved. Later, they will be unfastened before the towing vehicle 24 is to be moved forward during the final unhitching procedures.

As illustrated in FIGS. 20 and 31, the common vertical center line of the upper ball 34 and lower ball 32 remains just forward of the center of rotation of the vertical rotatable claw 28. Also the vertical center line of the lower forward end 301 of the equalizer arm 300 is the same vertical center line of the step down recess 302 thereof, the center line of the sway control disk 310, the center line of the sway control bearing, and the center line of the depending shaft 306 of the lock lug 305, and this overall vertical center line remains just spaced from the common vertical center line of the upper ball 34 and the lower ball 32. This grouping of these components in respect to these vertical center lines insures the overall good operational performance of this overall self aligning trailer hitch 295 utilizing this load equalizer assembly 290.

I claim:

1. A self aligning trailer hitch, used by a driver alone without creating any personal lifting force of a tongue of a towed vehicle, to couple and decouple a towing vehicle and a trailer, as the towing vehicle is backed toward the towed vehicle during couplings and later pulled away from the towed vehicle during uncoupling, comprising:
   a) a vertical dual ball assembly adapted for securement to the towed vehicle, having an upper ball adapted for securement to the towed vehicle, and a lower ball adapted for securement to the towing vehicle, via this self aligning trailer hitch; and
   b) a multiple piece assembly of a socket adapted for securement to a towing vehicle, comprising in turn:
      i) a rotatable claw, rotatable in a vertical plane, having a shaft rotatable supported in the said multiple piece assembly of the socket and having a spherical recessed surface adapted to receive a portion of the said lower ball of the said vertical dual ball assembly, which is adapted for securement to a towing vehicle, whereby upon rotation of the said rotatable claw, when contacting the said lower ball, when this socket is moving horizontally, during movement of the towing vehicle toward the towed vehicle during coupling of these vehicles, the said lower ball is repositioned by the said rotated rotatable claw by being guided and held in the said spherical recessed surface thereof which is repositioned from a horizontal receiving position to a radial upward holding position, upon rotation about the said shaft;
      ii) a three dimensional ramp to guide the said lower ball initially being contacted and received, when the said socket is moving to fully contact the said spherical recessed surface of the said rotatable claw, having an entry ramp portion, respective left and right side portions, which commence widely spaced to create a wide mouth entrance, and thereafter converge to a narrow throat exit, and respective left and right integral curved transition portions, located between the said entry ramp portion and the said respective left and right side portions, having a radii of these curved transition portions, that keeps the lower ball from being jammed on this ramp;
      iii) another spherical recessed surface of this said multiple piece assembly of a socket, to receive a portion of the said lower ball to stop the entering motion of the said lower ball and thereby contribute to the holding of the said lower ball; and
      iv) a lock to keep the said rotatable claw in the holding position thereof, when the said lower ball is in the said spherical recessed surface of the said rotatable claw, which is then in the said radial upward holding position.

2. A self aligning trailer hitch, as claimed in claim 1, wherein the entry ramp portion of the three dimensional ramp has a central recess at the narrow throat exit through which claw portions of the rotatable claw pass during the repositioning motion of the rotatable claw having these claw portions.

3. A self aligning trailer hitch, as claimed in claim 2, wherein the entry ramp portion of the three dimensional ramp has two spaced alike recesses at the narrow throat exit, leaving between them a portion of the entry ramp portion to serve as a guiding central gusset, which serves as a protective guide in directing the lower ball into the spherical recessed surface of the rotatable claw, whereby the lower ball is kept from lowering into a possible jamming position, while moving along the three dimensional ramp; and wherein the rotatable claw is formed, in the spherical recessed surface thereof, with a recess, in turn creating spaced claw portions, where upon rotation of the rotatable claw during coupling of a towing vehicle to a trailer, this recess accommodates the passing of the guiding central gusset of the entry ramp portion, as the spaced claw portions, move through the two spaced alike recesses located at the narrow throat exit.

4. In a self aligning trailer hitch, as claimed in claims 1, 2, or 3, wherein, in respect to the said lock,
 a) the said rotatable claw has a recessed portion to receive the said lock during the locking of the rotatable claw, when the lower ball has been repositioned;
 b) the said multiple piece assembly of the said socket has a receiving surface to receive the said lock during the locking of the rotatable claw; and
 c) a quick pin of the said lock to keep the said lock in the locking place thereof; both the said lock and the said multiple piece assembly of the said socket having respective aligned holes to receive the said quick pin.

5. A self aligning trailer hitch, as claimed in claims 1, 2, or 3, wherein the said multiple piece assembly of the socket has a hitch head body, which in turn integrally has:
 a) an attachment portion adapted to be attached to a towing bar assembly, which in turn is adapted to be secured to a towing vehicle;
 b) the said three dimensional ramp;
 c) the said spherical recessed surface which stops the entering motion of the lower ball;
 d) the said receiving surface to guide and to position the said lock;
 e) a central receiving volume to receive the said lower ball and to thereafter have the lower ball positioned above, in this central receiving volume, and also to receive the rotatable claw which repositions this rotatable ball; and
 f) said holes adapted to receive the said shaft of the said rotatable claw.

6. A self aligning trailer hitch, as claimed in claims 1, 2, or 3, wherein, when the lower ball has been repositioned by the rotatable claw, a vertical center line passing through the centers of the upper ball and the lower ball will be located nearer the towing vehicle than a vertical center line passing through the center of rotation of the rotatable claw, whereby this over centering offsets any tendency of the rotatable claw to reverse rotation, when a tow vehicle's automatic transmission is changed from a reverse to a park position.

7. A self aligning trailer hitch, as claimed in claims 1, 2, or 3, wherein the said multiple piece assembly of a socket has a means, inclusive of a quick pin, adapted to receive and to hold a chain link, and this trailer hitch has, in addition, a load equalizing assembly, comprising:
 a) a wishbone of a V configuration;
 b) a chain link passed over the wishbone and positioned at the V locale to be received and held by the said means, inclusive of a quick pin, adapted to receive and to hold a chain link; and
 c) adjustable securement means adapted for securement to the tongue of a towed vehicle to receive and to secure the wishbone bar, to be used in connecting this load equalizing assembly, between the towing vehicle and the towed vehicle.

8. A self aligning trailer hitch, as claimed in claim 3, wherein in respect to the said lock,
 a) the said rotatable claw has a recessed portion to receive a locking member during the locking of the rotatable claw, when the lower ball has been captured;
 b) the said multiple piece assembly of the socket has a receiving surface to receive a locking member during the locking of the rotatable claw;
 c) the said lock has an insert member serving as the said locking member to be guided and to be positioned by the said receiving surface, and to be received in the said recessed portion; and;
 d) the said lock has a quick pin to keep the said insert member in the locking place thereof, both the said insert member and the said multiple piece assembly having respective aligned holes to receive the quick pin.

9. A self aligning trailer hitch, as claimed in claim 8, wherein the multiple piece assembly of the socket has a hitch head body to integrally include an attachment portion adapted to be attached to a towing bar assembly, in turn adapted to be secured to a towing vehicle.

10. A self aligning trailer hitch, as claimed in claim 9, wherein the hitch head body integrally supports and positions:
 a) the said three dimensional ramp;
 b) the said spherical recessed surface that receives a sufficient portion of the lower ball to stop and to position the lower ball; and
 c) the said receiving surface utilizing during the locking of the rotatable claw upon the placement of the insert member.

11. A self aligning trailer hitch, as claimed in claim 10, wherein the hitch head body has a central receiving volume to receive the lower ball above and to receive the rotatable claw below in the lower ball receiving position.

12. A self aligning trailer hitch, as claimed in claim 11, wherein the hitch head body has side holes adapted to receive the shaft of the rotatable claw.

13. A self aligning trailer hitch, as claimed in claim 12, wherein the shaft of the rotatable claw is transversely mounted via the said side holes to support the rotatable claw in the central receiving volume of the hitch head body of the multiple piece assembly of the socket.

14. A self aligning trailer hitch, as claimed in claim 13, wherein the transversely mounted shaft of the rotatable claw which supports the rotatable claw, has an enlarged head at one end, and a radial hole at the other end, and a hair pin shaped keeper is retained using the radial hole.

15. A self aligning trailer hitch, as claimed in claim 14, having a T shaped bar, in turn having a vertical portion to be adjustably placed up and down in the receiving portion of the hitch head body and a horizontal portion adapted to be inserted into a towing bar assembly.

16. A self aligning trailer hitch, as claimed in claim 15, having a towing bar assembly for securement to a frame of a towing vehicle and to receive the horizontal portion of the T shaped bar.

17. A self aligning trailer hitch, as claimed in claim 16, wherein the receiving portion of the hitch head body, the T shaped body, and the towing bar assembly have holes to accommodate fasteners, and fasteners are inserted through these holes and secured.

18. A self aligning trailer hitch, as claimed in claim 17, wherein the side holes are positioned to in turn position the said transverse shaft and in turn position the said rotating claw, whereby a vertical centerline passing through the dual ball assembly is located nearer the towing vehicle than a vertical centerline passing through the shaft, whereby the said rotating claw continues to tend holding the lower ball as the locking of the rotatable claw is undertaken.

19. A self aligning trailer hitch, as claimed in claim 1 wherein the lock used to keep the rotatable claw in the lower ball holding position is an upstanding locking clevis of a pivoting link assembly, and this pivoting link assembly has a horizontal extending tongue pivotally connected at one end to the upstanding locking clevis, as a vertical pin serves as this pivotal connection, then at the other end, this pivoting link assembly has a securement end slot, transverse holes therethrough, and a transverse pin, which are all adapted to receive a chain link.

20. A self aligning trailer hitch, as claimed in claim 19 having a load equalizing assembly, comprising:
 a) a wishbone bar of a V configuration;
 b) a chain link passed over the wishbone and positioned at the V locale to be received and held by the horizontal extending tongue of the pivoting link assembly;
 c) adjustable securement means adapted for securement to the tongue of a towed vehicle, to receive and to secure the wishbone bar, to be used in connecting the load equalizing assembly, between the towing vehicle and the towed vehicle.

21. A self aligning trailer hitch, as claimed in claim 20, wherein the wishbone bar is a subassembly, which includes this wishbone bar, and turnbuckles and fasteners, serving as components of the said adjustable securement means.

22. A self aligning trailer hitch, as claimed in claim 21, wherein the said adjustable securement means also includes U-bolts and other fasteners to selectively position the wishbone bar on the tongue of the towed vehicle.

23. A self aligning trailer hitch, as claimed in claims 1, 2, or 3, wherein, in respect to the said lock,
 a) the said rotatable claw has a recessed portion to receive a locking member during the locking of the rotatable claw, when the lower ball has been repositioned;
 b) the said multiple piece assembly of the socket has a receiving surface to receive a locking member during the locking of the rotatable claw;
 c) the said lock has a lug portion of a lock lug serving as the said locking member to be guided and to be positioned by the said receiving surface of the said multiple piece assembly, and to be received in the said recessed portion of the said rotatable claw; and,
 d) the said lock has a quick pin to keep the said insert member in the locking place thereof, both the said inset member and the said multiple piece assembly having respective aligned holes to receive the quick pin;
 e) and a load equalizing assembly comprising:
  i) the said lock lug having integrally the said lug portion, having also a horizontal disk portion and a depending shaft portion having a bottom positioned groove;
  ii) an equalizer arm of a C shape arranged in a vertical plane, having a lower forward end, having in turn a recess; having an upper rear end, having in turn a central hole; and having a central elongated opening to receive a jack post;
  iii) a bearing to be received in the recess of the equalizer arm to receive the depending shaft portion of the said lock lug;
  iv) a sway control disk to be received in the recess of the equalizer arm, to be contacted by the horizontal disk portion of the lock lug;
  v) a retaining ring positioned in the bottom positioned groove of the depending shaft portion to keep together the lock lug, the sway control disk, the bearing, and the lower forward end of the equalizer arm;
  vi) an equalizer spring assembly for transverse placement across a trailer tongue and having a central hole, and
  vii) an equalizer bolt and nut fastener to secure the upper rear end to the equalizer spring assembly having the said centered hole, as this equalizer bolt is passed down through the said centered holes of the equalizer spring assembly and the upper rear end of this equalizer arm and then secured by the said nut of this equalizer bolt and nut fastener, thereby completing the securement of the self aligning trailer hitch having this load equalizer assembly.

24. A self aligning trailer hitch, as claimed in claim 23, wherein the equalizer spring assembly comprises:
 a) a bottom transverse member to be supported by the converging members of a tongue of a trailer and to position a bottom portion of a rubber like spring member and having a portion of the said central hole;
 b) a rubber like spring member supported on the bottom transverse member, and having a portion of the said central hole;
 c) a top transverse member to be positioned over the rubber like spring member at the top thereof, and having a central hole thereof to be aligned with the central hole of the equalizer arm.

25. A self aligning trailer hitch, as claimed in claim 24, wherein the equalizer spring assembly has a two position slider for back and forth transverse movement across the top transverse member having a central opening to accommodate relative transverse movements of the equalizer bolt, a lower supporting structure to support the said equalizer bolt, via the head thereof, at a lower elevation during most of the time of the hitching operation of the vehicles and the adjusting of this load equalizer, and a higher supporting structure to support the said equalizer bolt, via the head thereof, at a higher elevation during the later time of the hitching operations of the vehicles and the adjusting of this load equalizer, and during the entire time the hitching of the vehicles has been completed and the vehicles are ready for travel or are traveling.

26. A self aligning trailer hitch, as claimed in claim 23, wherein the equalizer spring assembly comprises:
 a) a bottom transverse member to be supported by the converging members of a tongue of a towed vehicle and having three side by side receivers arranged transversely to position bottom portions of three upstanding hollow cylindrical rubber like equalizer springs, and having a central hole thereof, to be aligned with the central hole of the equalizer arm;

b) three upstanding hollow cylindrical rubber like equalizer springs positioned in the three side by side receivers on the bottom transverse member; and c) a top transverse member having three side by side receivers to position the top portions of the said three upstanding hollow cylindrical rubber like equalizer springs, and to be so positioned on them, and having a proportional length of the said central hole.

27. A self aligning trailer hitch, as claimed in claim 23, wherein the equalizer spring assembly comprises:

a) a bottom transverse member to be supported by the converging members of a tongue of a towed vehicle and having two transversely spaced receivers to position bottom portions of two upstanding hollow cylindrical rubber like equalizer springs, and having a central hole thereof, aligned with the central hole of the equalizer arm;

b) two upstanding hollow cylindrical rubber like equalizer springs positioned in the two transversely spaced receivers on the bottom transverse member; and c) a top transverse member having two transversely spaced receivers to position the top portions of the said two upstanding hollow cylindrical rubber like equalizer springs, and to be so positioned on them, and having a proportional length of the said central hole.

28. A self aligning trailer hitch, as claimed in claim 23, wherein the equalizer spring assembly comprises:

a) a bottom transverse member to be supported by the conveying members of a tongue of a trailer and to position a bottom portion of a rectangular shaped rubber like spring member, and having a proportional length of the said central hole;

b) a rectangular shaped rubber like spring member supported on the bottom transverse member, and having a proportional length of the said central hole; and c) a top transverse member to be positioned over the rectangular shaped rubber like spring member at the top thereof, and having a central hole thereof, aligned with the central hole of the equalizer arm.

29. A self aligning trailer hitch, as claimed in claim 28, wherein both the bottom transverse member and the top transverse member are of a channel configuration, whereby the channel flanges respectively overlap the respective top and bottom ends of the rectangular shaped rubber like spring member.

30. A self aligning trailer hitch, as claimed in claim 23, wherein the equalizer spring assembly has a two position slider having lower supporting structure to support the said equalizer bolt, via the head thereof, at a lower elevation during most of the time of the hitching operations of the vehicles and the adjusting of this load equalizer, and a higher supporting structure to support the said equalizer bolt, via the head thereof, at a higher elevation during the later time of the hitching operations of the vehicles and the adjusting of this load equalizer, and during the entire time the hitching of the vehicles has been completed and the vehicles are ready for travel or are traveling.

31. A self aligning trailer hitch, as claimed in claim 23, wherein the vertical dual ball assembly, just below the middle thereof has a rearward extending reinforcing positioner, which is secured to the vertical dual ball assembly and which is adapted to be secured to the tongue structure.

32. A self aligning trailer hitch, as claimed in claims 1, 2, or 3, wherein the rotatable claw has a threaded recess to receive a position adjusting screw, and has such a position adjusting screw adjustably positioned, in part, in this recess, and protruding to contact the said lock, at a time when the rotatable claw is holding the lower ball in the multiple piece assembly of the socket in the towing position thereof.

33. A self aligning trailer hitch, as claimed in claims 1, 2, or 3, wherein the vertical dual ball assembly, just below a structure painting the upper ball and the lower ball has a rearward extending reinforcing positioner, which is secured to the vertical dual ball assembly and which is adapted to be secured to the tongue of the towed vehicle.

* * * * *